Figure 5A:
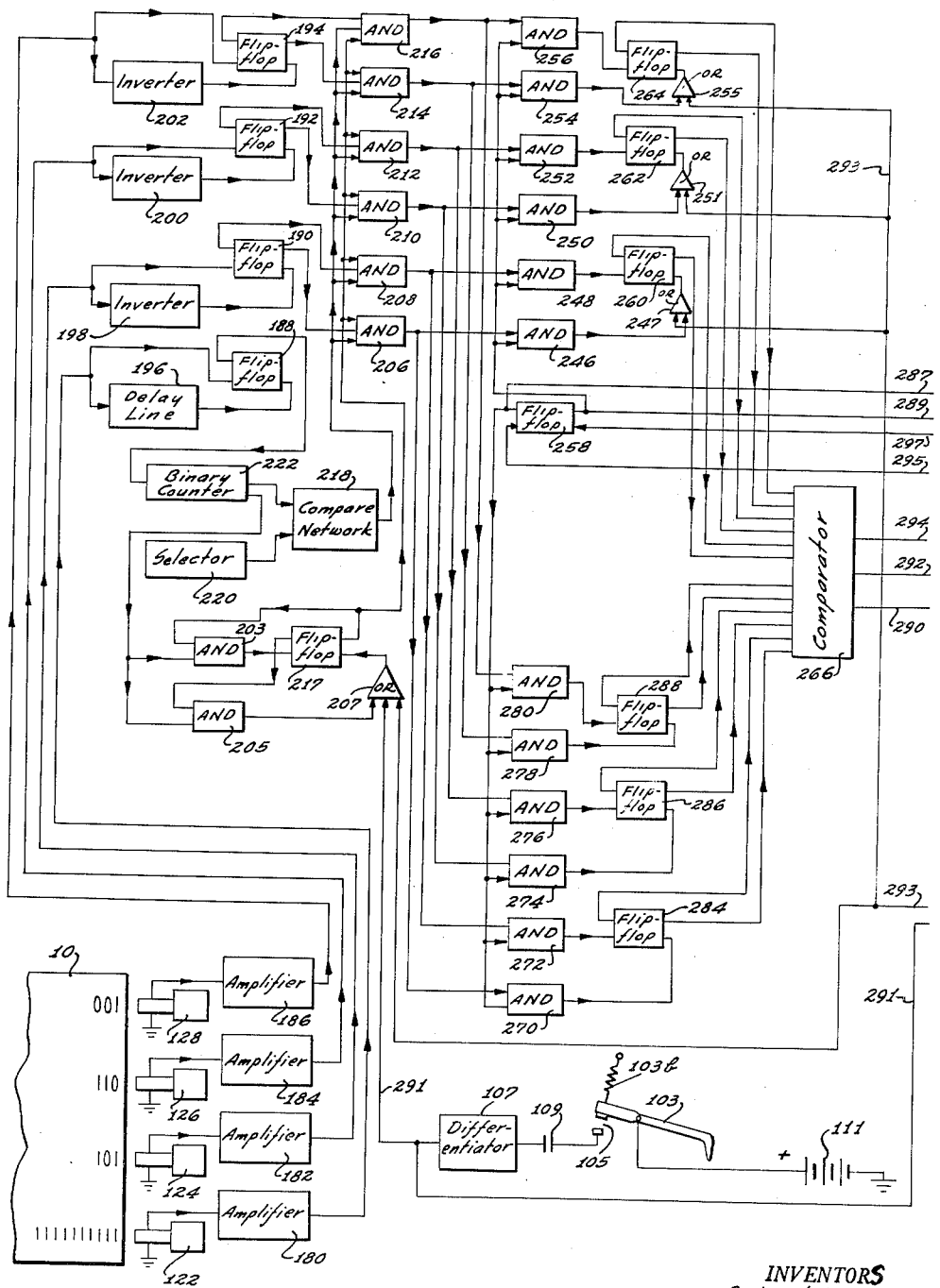

June 13, 1961
R. M. HAYES ET AL
2,988,216
CARD PROCESSING SYSTEM
Filed July 6, 1956
4 Sheets-Sheet 1
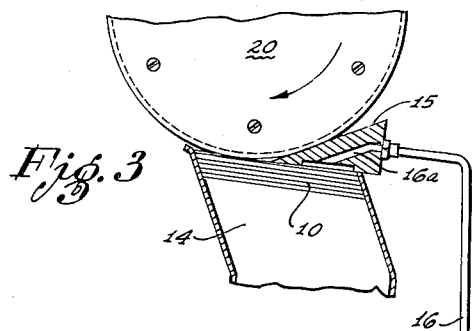
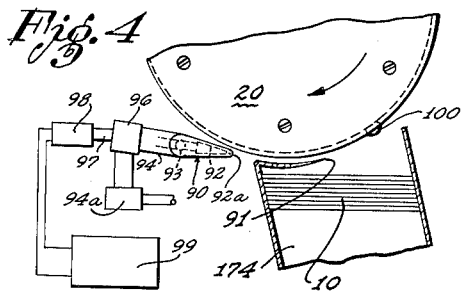
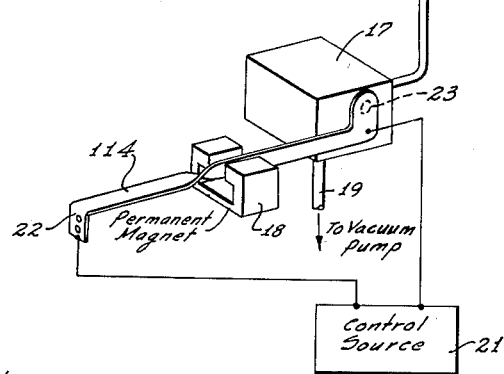
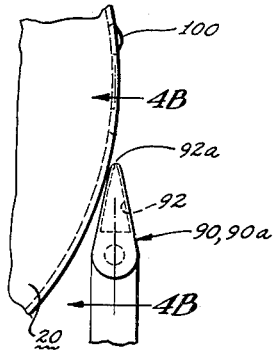
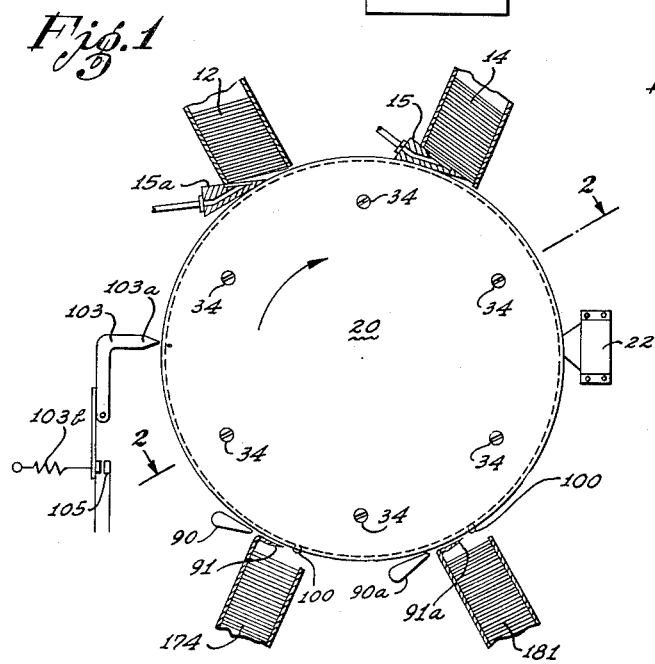
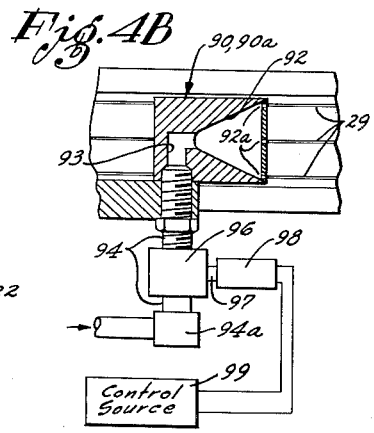
INVENTORS:
Robert M. Hayes
Jerome B. Wiener
BY Smyth & Roston
Attorneys.

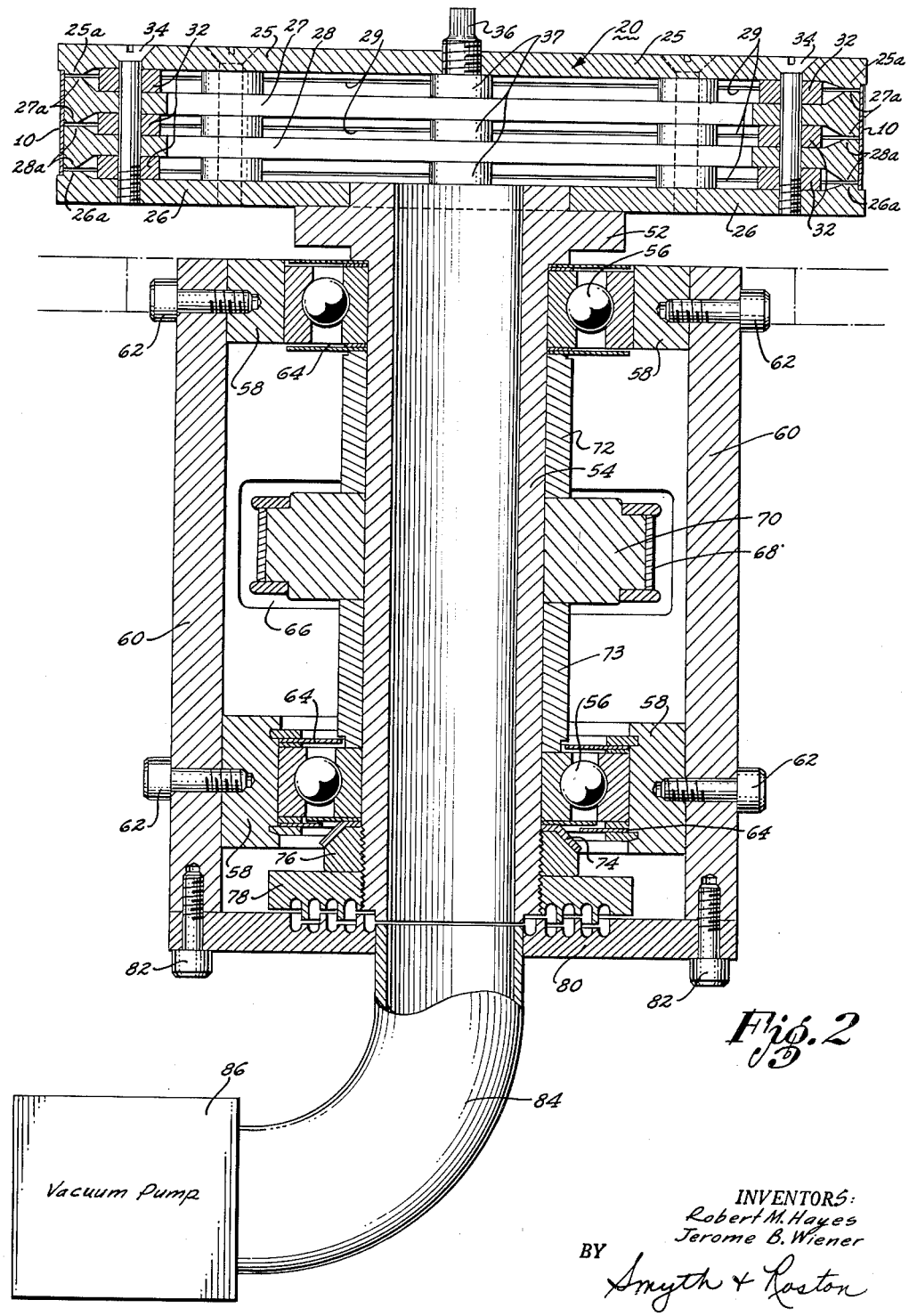

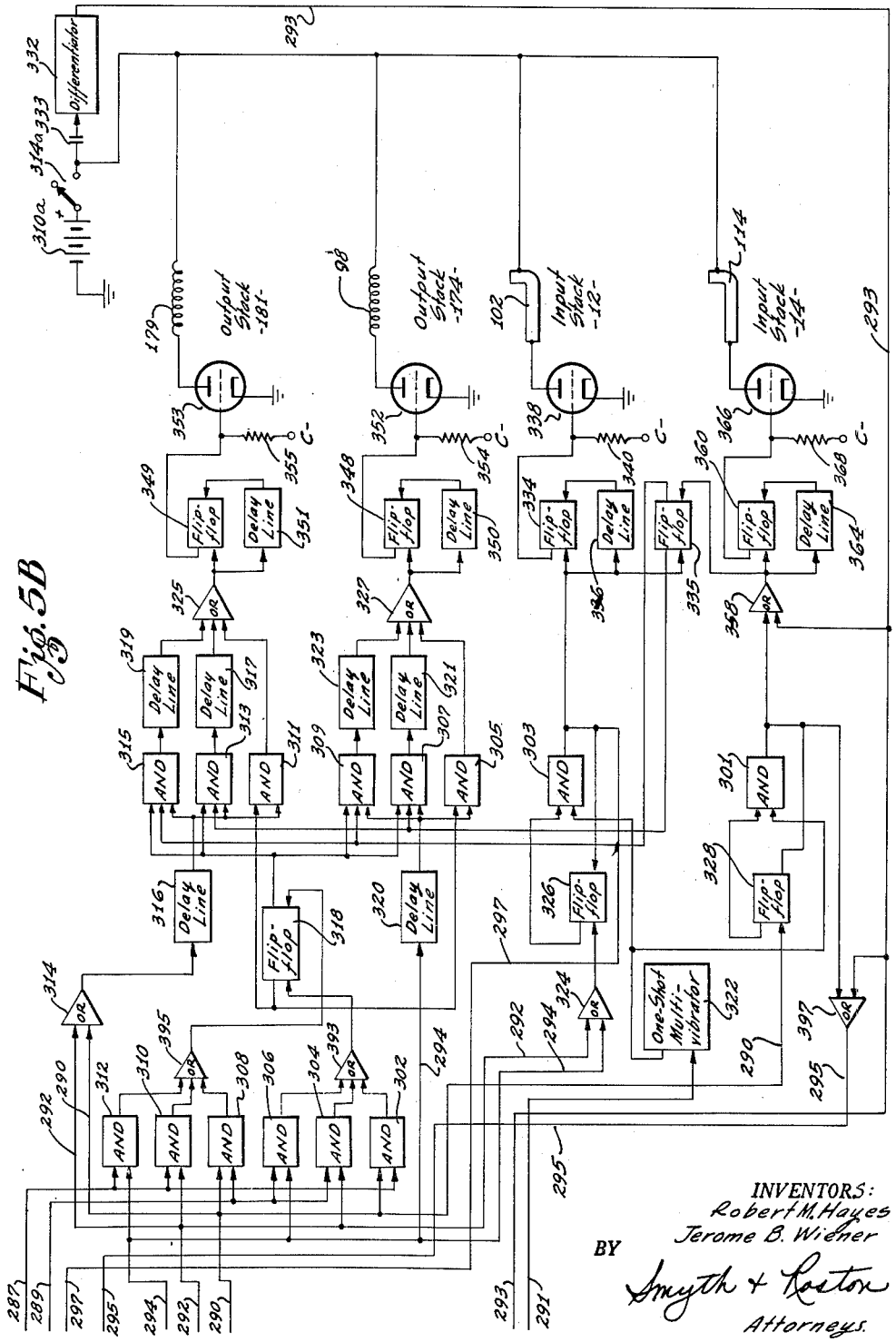

INVENTORS
Robert M. Hayes
Jerome B. Wiener
BY
Smyth & Roston
Attorneys.

United States Patent Office 2,988,216
Patented June 13, 1961

2,988,216
CARD PROCESSING SYSTEM
Robert M. Hayes, Los Angeles, and Jerome B. Wiener, Granada Hills, Calif., assignors to The Magnavox Company, Los Angeles, Calif., a corporation of Delaware
Filed July 6, 1956, Ser. No. 596,222
32 Claims. (Cl. 209—72)

This invention relates to apparatus such as systems for processing information stored in digital form. More particularly, the invention relates to apparatus for rearranging a plurality of cards in a logical pattern in accordance with information stored at particular positions on each card. The invention is especially concerned with apparatus capable of receiving a plurality of cards from one or more input stacks, for sensing the information at particular positions on each card and for depositing the cards in two or more output stacks in a sequence dependent upon the information at the selected positions.

The use of computers and data processing systems has become increasingly widespread in recent years. Digital computers have been constructed which are capable of solving complicated mathematical problems, some of them previously unsolvable or solvable only after intense mental effort over long periods of time. Probably of more general utility are the data processing systems, since these systems can perform complex business operations. For example, they can be used to provide a running inventory in large department stores or similar types of merchantile establishments, to establish a rapid check of credit and to provide other desired information in banking or loan institutions.

One known type of data processing system uses a plurality of information storage cards. These cards are generally provided with a rectangular shape and the information is stored on the cards as bits such as in the form of small holes or magnetized spots. Each card may be divided into successive vertical columns, with each vertical column containing a plurality of bits of information. Different information can be represented by particular patterns of the bits in each vertical column or sometimes in each horizontal column. Each card is scanned from one vertical column to the next such that a particular vertical column of any one card can be selected for sensing purposes. Since a tremendous amount of information can be stored on such cards, the system is capable of being used in complex operations. For example, some data processing systems may require hundreds of thousands of storage cards.

In data processing systems of the type described in the preceding paragraph, the need often arises to collate the cards in accordance with information on a particular vertical column in each card. For example, it is open desired to transfer from a first stack certain cards having information at a particular position corresponding to the information at the same or a different position in cards in a second stack. One object of the present invention is to provide improved and simplified apparatus capable of performing such a collating operation quickly and accurately.

By way of example, successive cards of a first stack may provide information in a progression such as 3, 9, 9, 15, 19, 22, etc., at a particular vertical column on the cards. Successive cards of a second stack may provide information in a progression such as 1, 2, 3, 7, 11, 19, etc., at the particular vertical columns on the cards. The need often arises in data processing systems to select from the second stack all of the cards which indicate at the particular vertical column numbers or other symbols corresponding to the numbers or symbols indicated at the same vertical column by the cards in the first stack. The need further arises to collate the cards into another stack in which the cards selected from the second stack are mingled in the proper sequence with the cards from the first stack. For example, the cards representing 3 and 19 in the second stack should be selected and mingled with the cards of the first stack so that the cards in the third stack successively represent information in a progression 3, 3, 9, 9, 15, 19, 19, 22, etc. The apparatus constituting this invention is capable of obtaining this result and of doing this quickly, efficiently and accurately.

The apparatus constituting this invention includes a rotatable drum which receives the information storage cards from two or more input stacks disposed in coupled relationship to the drum. The cards are disposed in fixed position on the periphery of the drum and are transported by the drum past a series of transducer heads. The heads are activated such that the information at a particular vertical column on each card is sensed and compared with information at the particular vertical column on the preceding card. One of the cards is selected in accordance with the relative values of the information at the particular vertical column on the two cards traveling on the drum. This card is directed to either the first or second output stacks in accordance with the relative values of the information at the particular position on the cards. The other card remains on the drum for another revolution of the card. In this way, one type of collating operation is performed. As will become more apparent subsequently, other types of collating operations may be performed. Other types of operations such as merging operations may also be performed.

Every time that a card is transferred to one of the output stacks, it is replaced by the next card from one of the input stacks. The card constituting the replacement is taken from the same input stack as the input stack which previously supplied the card just transferred to the output stack. In this way, a comparison is made between successive pairs of cards on the drum to provide a determination as to which of the cards in each pair should be transferred to the output stack and as to which output stack the card should be transferred.

In the drawings:
FIGURE 1 is a top plan view of collating apparatus constituting one embodiment of the invention and includes a rotatable drum for controlling the transfer of information storage cards from two or more input stacks to two or more output stacks;
FIGURE 2 is an enlarged sectional view substantially on the line 2—2 of FIGURE 1 and illustrates in further detail the construction of the rotatable drum forming a part of the embodiment shown in FIGURE 1;
FIGURE 3 is a fragmentary view, partly in section and partly in perspective, schematically showing a portion of the rotatable drum of FIGURE 1 and also shows one of the input stacks associated with the drum and suitable means for controlling the transfer of cards from the input stack to the periphery of the drum;
FIGURE 4 is a fragmentary view, partly in section and partly in perspective, schematically showing a portion of the rotatable drum of FIGURE 1 and also illustrates an output stack associated with the drum and apparatus for controlling the transfer of the cards from the periphery of the drum to the output stack;
FIGURE 4A is an enlarged fragmentary view similar to that shown in FIGURE 4 and illustrates in further detail the drum and the apparatus for controlling the transfer of cards from the drum;
FIGURE 4B is an enlarged fragmentary sectional view substantially on the line 4B—4B of FIGURE 4A and illustrates in further detail the apparatus for controlling the transfer of cards from the drum; and FIGURES 5A and 5B are diagrams, partly in block form, illustrating somewhat schematically an electric system for controlling the operation of the apparatus shown in the previous figures.

In the embodiment of the invention shown in the drawings, the apparatus includes a central drum 20 which is mounted for rotation about a vertical axis. A pair of input stacks 12 and 14 are mounted adjacent the peripheral surface of the drum 20 at spaced angular positions about the drum. Each of the stacks 12 and 14 supports a plurality of cards 10 in a stacked condition such that the face of the first card in each stack rests against the peripheral surface of the drum.

As best seen in FIGURE 5A, each card 10 may have a plurality of bits of information disposed in horizontal rows. The bits of information in each horizontal row may be vertically aligned with corresponding bits of information in the other rows to form vertical columns. Each bit of information represents digital intelligence by itself or in combination with other bits. As is well understood in the art, this intelligence may relate to numbers, alphabetical letters, combinations of numbers and letters or any other pertinent matter. The bits of information may be represented by holes or by magnetized areas, the latter being preferred. When the information is stored magnetically, magnetic flux of one polarity for any particular bit may represent an indication of "0," and magnetic flux of the opposite polarity for the bit may represent an indication of "1."

As shown in detail in FIGURE 2, the drum 20 includes a pair of external plates 25 and 26 spaced from one another in parallel horizontal planes. These external plates define a housing and have axially inwardly disposed lip portions 25a and 26a at their peripheries. A second pair of plates 27 and 28 are disposed within the housing defined by the external plates 25 and 26 and are in spaced parallel relationship with each other and with the external plates. The plates 25 and 26 are fixedly positioned with respect to each other and to the plates 27 and 28 by studs 34 extending through the plates and as by spacers 32 mounted on the studs. A plug 36 also extends into a threaded socket at the center of the external plate 25.

The radius of the plates 27 and 28 is slightly less than that of the external plates 25 and 26 by a distance corresponding substantially to the thickness of each card 10 so as to form a channel around the periphery of the drum for holding the card. Annular flange portions 27a and 28a extend axially from both faces of the plates 27 and 28 at the periphery of the plates. The flange portions 27a and 28a on the plates 27 and 28 are separated from each other and from the lip portions 25a and 26a on the plates 25 and 26 by relatively small distances so as to define slots 29. The slots 29 communicate with suction passageways formed between pairs of the adjacent plates 25, 26, 27 and 28 as by the spacers 32.

The drum 20 is push fit on a hollow shaft 54 and is disposed against an annular collar 52 provided at one end of the shaft. Bearings 56 are provided at opposite ends of the shaft 54. The inner races of the bearings 56 are mounted on the shaft and the outer races are disposed against bushings 58 secured to a housing 60 as by studs 62. Seals 64 are disposed at opposite ends of the bearings to prevent leakage of the lubricant. An aperture 66 is provided in the housing 60 at a position between the bearings 56. The aperture 66 receives a belt 68 which extends around a pulley 70 secured to the shaft 54. A suitable motor (not shown) drives the belt 68 so as to rotate the shaft 54.

The bearings 56 and the pulley 70 are maintained in fixed axial positions on the shaft 54 as by a pair of sleeves 72 and 73 mounted coaxially with the shaft and respectively interposed between the pulley and the bearings. The bearings, pulley and sleeves are held in fixed position on the shaft 54 as by a lock washer 74 and a nut 76. The nut 76 is adapted to be screwed on a threaded portion at the bottom of the shaft 54. A sealing disc 78 is also screwed on the threaded portion of the shaft 54 below the nut 76. The sealing disc 78 operates in conjunction with a bottom plate 80 to prevent air leakage between the interior of the housing 60 and the interior of the hollow shaft 54 because of the difference in pressure between the housing and the shaft.

The plate 80 is secured to the housing 60 as by studs 82. A hollow conduit 84 fits snugly a central aperature in the plate 80 so as to communicate with the hollow shaft 54. In this manner, air can be exhausted from the hollow interiors of the shaft 54 and the conduit 84 by a vacuum pump indicated in block form at 86. Therefore, a vacuum pressure can be provided through these interiors to the slots 29 at the periphery of the drum 20 to hold the information storage cards 10 in fixed position on the periphery of the drum as the drum rotates.

Referring again to the apparatus shown in FIGURE 1, it can be seen that input transfer means such as a card retainer 15 is associated with the input stack 14 and that input transfer means such as a retainer 15a is associated with the input stack 12. During the time that a vacuum force is produced in the retainer 15, the retainer 15 operates to counteract the vacuum and friction forces exerted by the drum 20 against the first card in the stack 14 so as to prevent the first card from being withdrawn by the drum from the stack. In like manner, the retainer 15a operates to prevent cards from being withdrawn by the drum 20 from the stack 12.

Whenever the vacuum force in the retainer 15 or in the retainer 15a becomes interrupted, the card contacted by the drum 20 is drawn by the drum 20 out of the corresponding stack 12 or 14. The duration of the interruption in the vacuum force produced in the retainers 15 and 15a can be controlled to permit only one card at a time to be drawn onto the peripheral channel of the drum 20. The construction of retainers similar to the retainers 15 and 15a is disclosed in detail in co-pending application Serial No. 552,506, filed December 12, 1955, by Hans M. Stern.

A typical control arrangement for the unit 15 is shown in FIGURE 3. It will be appreciated that an identical arrangement can be used for the unit 15a. As shown in FIGURE 3, an air line 16 extends to the retainer 15 and communicates with a conduit 16a in the retainer. The conduit 16a extends through the retainer 15 to a position contiguous to the card 10 which is disposed in the stack 14 in frictional relationship to the drum 20. The line 16 extends at its opposite end to a control chamber 17. The chamber 17 is connected to a suitable vacuum pump (not shown) through an air line 19. This chamber is provided with an aperture 23 which is normally covered and rendered air-tight by a resilient, electrically conductive arm 114. This arm is affixed to a rigid support as at 22. The arm 114 also passes through a static magnetic field, produced as by a permanent magnet 18. It should be appreciated that an electro-magnet can be used in place of the permanent magnet 18 to produce the magnetic field, such a substitution being well-known in the art. An electrical connection is completed through the arm 114 from a control source 21.

The vacuum pump described above produces a constant vacuum force through the line 19 and in the chamber 17. So long as the aperture 23 remains covered, this vacuum force is transmitted through the line 16 to the conduit 16a and is directed against the cards 10 to retain the cards in the stack 14. However, when a flow of current is initiated through the resilient arm 114 from the source 21, a magnetic field is established about the arm. This magnetic field coacts with the magnetic field provided by the permanent magnet 18 so as to obtain a downward movement of the arm 114 below the aperture 23. This causes the aperture 23 to become opened.

Whenever the aperture 23 is opened, the vacuum force is removed from the conduit 16a such that the card 10 contacted by the drum 20 is able to be withdrawn by the drum from the stack 14. As will be described in detail subsequently, the control source 21 provides a signal for a sufficiently long time to obtain the withdrawal of only one card from the input stack 14 to the drum 20. This results from the fact that the resilient arm 114 returns upwardly to its position covering the aperture 23 as soon as the signal from the control source 21 is terminated. This prevents any further cards from being removed by the drum 20 from the input stack 14. The control apparatus described above is similar to that described in detail and claimed in copending application Serial No. 552,506, filed December 12, 1955, by Hans M. Stern. The co-pending application is assigned to the assignee of the present application.

The stacks 12 and 14 constitute the input stacks of the apparatus. These stacks are controlled in a manner to be described such that a card is selected from one or the other of these stacks and transported on the periphery of drum 20 as the drum rotates. The selected card is carried by the drum past a series of magnetic transducing heads such as heads 122, 124, 126 and 128. These heads may be arranged in a bank similar to that shown in FIGURE 5A so as to scan successive vertical columns of information on each card as the card moves past the heads. It will be evident as the description proceeds that as many heads can be used as there are rows of information and that the illustrated number is merely by way of example. As each card is transported by the drum 20 past the magnetic heads 122, 124, 126 and 128, the information at a selected position on the cards is sensed by the heads and is made available for subsequent use.

Output stacks 174 and 181 are disposed in contiguous relationship to the drum 20 at positions diametrically opposite to the input stacks 14 and 12, respectively. The output stacks 174 and 181 respectively have throat members 91 and 91a which extend partially across the entrance to the stacks adjacent the periphery of the drum 20. The throat members 91 and 91a extend from the wall defining the trailing edge of their associated stacks toward the wall defining the leading edge of their associated stacks. The thickness of the throat members 91 and 91a is preferably tapered at the forward end of the throat members to facilitate the transfer of cards from the drum 20 to the throat members.

The throat members 91 and 91a are so arranged that the cards in the peripheral channel of the drum 20 move with the drum past the output stacks 181 and 174 without becoming transferred to the stacks during the time that no force is being exerted against the cards by the passage of air through output transfer means such as lifters 90 and 90a. However, when a flow of air is established in either of the lifters 90 or 90a, the leading edge of the transported card is drawn away from the periphery of the drum 20 and is positioned on a corresponding throat member 91 or 91a. This will be described in detail subsequently.

When a card becomes positioned on the throat member 91 or the throat member 91a, subsequent rotation of the drum 20 causes the card to become stripped off the periphery of the drum and deposited in the particular one of the output stacks 174 and 181 associated with the actuated lifter. The cards become deposited on the throat members 91 and 91a since the lifters 90 and 90a are disposed at one end in contiguous relationship to the periphery of the drum 20 and in adjacent relationship to the associated throat members.

The construction of the lifter 90 and its associated members is shown in further detail in FIGURES 4A and 4B. As shown in FIGURES 4A and 4B, the lifter 90 has a configuration corresponding substantially to a tear drop in a horizontal plane. In this configuration, the lifter 90 is symmetrical about a line which is tangential to the periphery of the drum 20 at a position slightly displaced from the throat member 91 in the counterclockwise direction. The lifter 90 has a tapered configuration such that its narrow end is near the periphery of the drum 20 at a position slightly retarded from the rear wall of the stack 174 in the direction of drum rotation.

The lifter 90 has a hollow interior shaped to define a mouth portion 92. The mouth portion 92 occupies almost the entire dimension of the lifter 90 in a lateral dimension. The mouth portion 92 has a flared configuration in the vertical direction with progressive movements toward the periphery of the drum 20 so as to have gradually increasing dimensions in this direction. The mouth portion 92 communicates with holes 92a provided in the lifter 90 at the end of the lifter closest to the periphery of the drum 20. The holes 92a are disposed in the vertical direction at spaced positions corresponding to the vertical levels of the slots 29 in the drum 20. The mouth portion 92 and the holes 92a are so disposed in the lifter 90 that the air passing through the holes will be directed through the channel between the throat member 91 and the periphery of the drum 20.

A passageway 93 extends through the lifter 90 and communicates with the narrow end of the mouth portion 92. A feed line 94 is in turn coupled at one end to the passageway 93 and at the other end is adapted to receive air under pressure from a source indicated in block form at 94a. A suitable valve 96 is disposed in the line 94 to control the flow of air through the line. The valve 96 may be a suitable valve such as a poppet valve which is normally closed and which is adapted to become opened when an armature 97 is actuated. The armature 97 is associated with a solenoid 98 so as to become actuated when the solenoid is energized. The solenoid 98 is in turn energized by a signal from a control source indicated in block form at 99. The control source will be described in detail subsequently.

When the solenoid 98 becomes energized by a signal from the control source 99, it acts upon the armature 97 to produce an opening of the valve 96. This causes air under pressure to pass from the source 94a through the feed line 94 into the lifter 90. The air flows through the passageway 93 and the mouth portion 92 of the lifter 90 and emerges as streams of air from the holes 92a in the thin end of the lifter.

The streams of air have a relatively high velocity because of the small diameter of the holes 92a. This causes the streams of air to impinge on the periphery of the drum 20 with a relatively great force. The force exerted by the streams of air remains substantially constant as the drum 20 rotates since no such members as studs or spacers can interrupt the stream of air in any positioning of the drum.

The streams of air passing through the holes 92a are directed against the card on the periphery of the drum 20 after passing through the channel between the throat member 91 and the periphery of the drum. The streams of air in effect exert a shearing force between the periphery of the drum 20 and the cards 10 on the periphery of the drum such that the cards become removed from the drum. The cards become removed from the drum 20 at a position contiguous to the throat member 91 so as to become lifted on the throat member. The cards then travel along the throat member 91 into the stack 174 as the drum 20 continues to rotate.

Pawls 100 operate to insure that the cards 10 withdrawn by the lifter 90 become positioned in the proper order in the stack 174. The construction and disposition of the pawls 100 are described in full detail in Nelson Patent 2,752,154. The pawls 100 are displaced from the wall defining the trailing end of the output stack 174 in the counterclockwise direction by a distance less than the length of the cards 10. In this way, the pawls 100 are disposed at a position retarded with respect to the wall defining the leading edge of the output stack 174. The pawls 100 extend into the slots 29 of the drum 20 at their opposite ends and curve outwardly from the drum 20 in a humped configuration at an intermediate position. The pawls 100 are preferavly provided with a length less than the length of each card so that a portion of each card is attracted to the peripheral surface of the drum 20 as the card moves along the drum. Because of this, the card cannot drop from the pawl 100 as the card moves along the pawl. In this way, the pawls lift the tail end of each card transferred to the output stack 174 so that the next card transferred to the stack can become positioned between the pawls and the first card. By such action, the next card must become positioned after the first card in the output stack 174.

The construction and operation of the lifter 90 and the associated members are fully disclosed in co-pending application Serial No. 562,154, filed January 30, 1956, by Stuart L. Peck and Loren R. Wilson. This embodiment is shown in FIGURES 5 and 6 of the co-pending application. Another embodiment suitable for use in this invention is shown in FIGURES 1 to 4, inclusive, of the co-pending application and is described fully in that application. Still another embodiment suitable for use in this invention is disclosed in co-pending application Serial No. 571,088, filed March 12, 1956, by Minoru T. Endo.

FIGURES 5A and 5B show the electrical system for controlling the operation of the apparatus shown in FIGURES 1 to 4, inclusive, and described above. The control system includes a plurality of magnetic transducing members such as the heads 122, 124, 126 and 128. These heads are so disposed that they scan the successive columns of each of the cards 10 as the cards are moved by the drum past the heads. The output signals from the heads are amplified by amplifiers 180, 182, 184 and 186 in FIGURE 5A, and the output signals from the amplifiers are respectively impressed on the left input terminals of flip-flops 188, 190, 192 and 194. The flip-flops may be constructed in a manner similar to that described on pages 164 to 166, inclusive, of volume 19 entitled "Wave Forms" of the Radiation Laboratories Series published in 1949 by the Massachusetts Institute of Technology.

Each of the flip-flops in the electrical system is provided with two input terminals designated for convenience as the left and right input terminals and is provided with two output terminals designated for convenience as the left and right output terminals. The input terminals are shown at the bottom of the block representing the flip-flop and the output terminals are shown at the top of the block. A negative input signal impressed on any one of the input terminals produces a corresponding positive voltage at the corresponding output terminal of the flip-flop. The output signals from the amplifiers 180, 182, 184 and 186 are shown as being respectively introduced to the left input terminals of the flip-flops 188, 190, 192 and 194.

The output signal from the amplifier 180 is also introduced through a delay line 196 to the right input terminal of the flip-flop 188. The delay line 196 is adapted to provide a delay equal to substantially one half of the time required for adjacent vertical columns of each card 10 to move past the heads 122, 124, 126 and 128. The signals passing through the delay line trigger the flip-flop 188 to produce a relatively high voltage on the right output terminal of the flip-flop.

The output signals from the amplifiers 182, 184 and 186 are respectively introduced through inverters 198, 200 and 202 to the right input terminals of the flip-flops 190, 192 and 194. The inverters 198, 200 and 202 may be conventional amplifier circuits which invert the polarity of the signals introduced to the inverters. The right and left output terminals of the flip-flops 190, 192 and 194 are connected respectively to the input terminals of "and" networks 206 and 208, "and" networks 210 and 212 and "and" networks 214 and 216. The "and" networks 206, 208, 210, 212, 214 and 216 may be constructed in a manner similar to that disclosed in FIGURE 3 of Patent 2,723,080 and FIGURE 12 of Patent 2,609,143. Each of the "and" networks 206, 208, 210, 212, 214 and 216 is provided with other input terminals and is so constructed that a signal can pass through the "and" network only when positive signals are simultaneously impressed on all of the input terminals of the "and" network.

The left output terminal of the flip-flop 188 is connected to a binary counter 222, and the output terminal of the binary counter is connected to a compare network 218. A selector 220 is also connected to the compare network 218, and the output terminal of the compare network is connected to an input terminal of each of the "and" networks 206, 208, 210, 212, 214 and 216. The selector 220 may be manually adjusted ot indicatet any particular value. This causes the compare network 218 to pass a signal only when the count from the binary counter 222 corresponds to the count indicated by the selector 220. Since the binary counter 222 counts the clock signals produced by the flip-flop 188, it indicates the number of vertical columns which have moved on the card past the heads 122, 124, 126 and 128. In this way, the compare network 218 passes a signal only when the card 10 has moved relative to the heads 122, 124, 126 and 128 so that a particular column of information has been presented to the heads. The construction and operation of the selector 220 and the compare network 218 are described in considerable detail in co-pending application Serial No. 566,404, filed February 20, 1956 by Jerome B. Wiener.

The output terminal of the binary counter 222 is also connected to input terminals of an "and" network 203 and an "and" network 205. A second input terminal of the "and" network 203 is connected to the right output terminal of a flip-flop 217. In like manner, a second input terminal of the "and" network 205 receives the voltage on the left output terminal of the flip-flop 217. The signals from the "and" network 203 are applied to the left input terminal of the flip-flop 217. The signals from the "and" network 205 pass through an "or" network 207 to the right input terminal of the flip-flop 217.

The "or" networks such as the "or" network 207 described above may be any of the well-known types of networks which are now in general use in the computer art. Such networks are conditioned to pass a signal upon the introduction of a positive signal to any one or more of its input terminals. The "or" networks such as the network 207 may also be constructed in a manner similar to that disclosed in FIGURE 3 of Patent 2,723,080 and FIGURE 12 of Patent 2,609,143.

Another input terminal of the "or" network 207 is connected to the output terminal of a differentiator 107 which may be constructed in a manner similar to that described on pages 2–27 to 2–28, inclusive, of "Principles of Radar" (second edition) published by the Massachusetts Institute of Technology. The input terminal of the differentiator 107 is connected to one terminal of a capacitance 109. The other terminal of the capacitance 109 has a common connection with the stationary contact of a switch 105. The movable contact of the switch 105 is attached to a sensor 103 pivotable at an intermediate position against the action of a spring 103b.

The sensor 103 has a finger 103a which is disposed against the periphery of the drum 20 at a position diametrically opposite to the heads 122, 124, 126 and 128, as may be best seen in FIGURE 1. Because of its disposition in contiguous relationship to the drum 20, the finger 103a becomes engaged by each card 10 as the card moves with the drum 20 past the finger. When the finger 103a becomes engaged by a card, the sensor 103 becomes pivoted in a counterclockwise direction to close the switch 105. The portion of the sensor removed from the finger 103a may be made from an electrically conductive material and is connected to one terminal of a suitable voltage source such as a battery 111. The other terminal of the battery 111 may be grounded.

The output signals from the "and" networks 206, 208, 210, 212, 214 and 216 are respectively impressed on input terminals of a plurality of "and" networks 246, 248, 250, 252, 254 and 256. Second input terminals of the networks 246, 248, 250, 252, 254 and 256 are connected to the right output terminal of a flip-flop 258. Connections are respectively made from the output terminals of the "and" networks 246 and 248 to the right and left input terminals of a flip-flop 260, the connection to the right input terminal of the flip-flop being made through an "or" network 247. Connections are similarly made from the output terminals of the "and" networks 250 and 252 to the right and left input terminals of a flip-flop 262, the connection of the right input terminal of the flip-flop being made through an "or" network 251. In like manner, the signals from the output terminals of the "and" networks 254 and 256 are applied to the right and left input terminals of a flip-flop 264, the signals being applied to the right input terminal of the flip-flop through an "or" network 255. Each of the "or" networks 247, 251 and 255 has a second input terminal which is connected to a lead 293.

The left and right output terminals of the flip-flops 260, 262 and 264 are connected to a comparator 266 which is shown in block form for purposes of simplicity. The comparator 266 is formed from a plurality of "and" and "or" networks interrelated in a pattern which will be set forth subsequently by logical equations. The comparator may be constructed and operated in a manner similar to that disclosed in Knutsen Patent 2,712,898 or Kouzmine Patent 2,501,821. The comparator 266 may also be constructed in accordance with the logical equations set forth hereinafter and in accordance with the "and" and "or" networks shown on page 32 of "Arithmetic Operations in Digital Computers" by R. K. Richards (published by D. Van Nostrand in 1955) and in accordance with the discussion on pages 33 to 80, inclusive, of that book. The discussion on pages 33 to 80, inclusive, of the book by Richards indicates how various "and" and "or" networks may be combined in accordance with complex logical equations.

The output terminals of the "and" networks 206, 208, 210, 212, 214 and 216 are not only respectively connected to the "and" networks 246, 248, 250, 252, 254 and 256 but are also respectively connected to input terminals of a plurality of "and" networks 270, 272, 274, 276, 278 and 280. Each of the "and" networks 270, 272, 274, 276, 278 and 280 has a second input terminal which is connected to the left output terminal of the flip-flop 258. Connections are respectively made from the output terminals of the "and" networks 270 and 272 to the right and left input terminals of a flip-flop 284, from the output terminals of the "and" networks 274 and 276 to the right and left input terminals of a flip-flop 286, and from the output terminals of the "and" networks 278 and 280 to the right and left input terminals of a flip-flop 288. The left and right output terminals of the flip-flops 284, 286 and 288 are connected to the comparator 266.

The comparator 266 has three output terminals which are connected respectively to leads 290, 292 and 294 shown in FIGURES 5A and 5B. The signals in the leads 290 and 292 are adapted to pass through an "or" network 314 (FIGURE 5B) to the input terminal of a delay line 316. The delay line 316 is provided with characteristics for delaying a signal for a period of time corresponding substantially to the time required for a card to move from the heads 122, 124, 126 and 128 to the output stack 181 in FIGURE 1. The output terminal of the delay line 316 is connected to "and" networks 311, 313 and 315 in FIGURE 5B.

The output signals from the "and" network 311 are directly introduced to an input terminal of an "or" network 325. However, the output signals from the "and" networks 313 and 315 respectively pass through delay lines 317 and 319 to input terminals of the "or" network 325. The delay line 317 is provided with characteristics for delaying signals for a period of time corresponding to the time required for a card to move with the drum 20 from the heads 122, 124, 126 and 128 to the output stack 174 in FIGURE 1. The delay line 319 provides a delay corresponding substantially to the time required for a card to travel with the drum 20 from the heads 122, 124, 126 and 128 to the output stack 181 in FIGURE 1.

The output terminal of the "or" network 325 is connected to the left input terminal of a flip-flop 349 and to the input terminal of a delay line 351 having its output terminal connected to the right input terminal of the flip-flop. The left output terminal of the flip-flop 349 is connected to the control grid of a vacuum tube 353, the control grid being returned to a negative biasing source C— through a grid resistor 355. The cathode of the tube 353 is grounded, and the anode of the tube is connected to one terminal of a solenoid 179. The solenoid 179 may correspond to the solenoid 98 shown in FIGURE 4 so as to control the transfer of the cards from the drum 20 to the output stack 181. The other terminal of the solenoid 179 is connected to the stationary contact of a manually operated switch 314a. The movable contact of the switch 314a is connected to the positive terminal of a suitable voltage source such as a battery 310a. The negative terminal of the battery 310a is grounded.

The output lead 294 from the comparator is connected to the input terminal of a delay line 320 which is adapted to provide a delay corresponding to the time required for a card to move with the drum 20 from the heads 122, 124, 126 and 128 to the output stack 174. The output terminal of the delay line 320 is connected to input terminals of "and" networks 305, 307 and 309. The output terminal of the "and" network 305 is connected directly to an input terminal of an "or" network 327. However, the signals from the "and" networks 307 and 309 respectively pass through delay lines 321 and 323 to input terminals of the "or" network 327. The delay lines 321 and 323 are provided with characteristics respectively corresponding to the characteristics of the delay lines 317 and 319.

The signals from the "or" network 327 pass to the left input terminal of a flip-flop 348 and through a delay line 350 to the right input terminal of the flip-flop. The left output terminal of the flip-flop 348 is connected to the control grid of a vacuum tube 352, this grid being biased from the negative source C— through a grid resistor 354. The cathode of the tube 352 is grounded and the anode of the tube is connected to one terminal of the solenoid 98 (also shown in FIGURE 4). The other terminal of the solenoid 98 is connected to the stationary contact of the switch 314.

The output leads 292 and 294 from the comparator 266 are also respectively connected to input terminals of an "or" network 324. The signals passing through the "or" network 324 are applied to the left input terminal of a flip-flop 326. The left output terminal of the flip-flop 326 has a common connection with one input terminal of an "and" network 303, another input terminal of which is connected to the left output terminal of a one-shot multivibrator 322. The output terminal of the "and" network 303 is connected through a lead 297 (FIGURES 5A and 5B) to the right input terminal of the flip-flop 258 in FIGURE 5A.

The signals from the "and" network 303 are also applied to the left input terminal of a flip-flop 334 and to the input terminal of a delay line 336 having its output terminal connected to the right input terminal of the flip-flop. The left output terminal of the flip-flop 334 is connected to the control grid of a vacuum tube 338, this grid being biased from the negative source C— through a resistor 340. The cathode of the tube 338 is grounded and the anode of the tube is connected to one terminal of an arm 102 having its other terminal connected to the stationary contact of the switch 314. The arm 102 may be constructed in a manner similar to the arm 114 shown in FIGURE 1 so as to control the removal of cards by the drum 20 from the input stack 12.

The output terminal of the "and" network 303 is also connected to the left input terminal of a flip-flop 335. The left output terminal of the flip-flop 335 is connected to input terminals of the "and" networks 307 and 313. The right output terminal of the flip-flop 335 is connected to input terminals of the "and" networks 309 and 315. Other input terminals of the "and" networks 307, 309, 313 and 315 receive voltages from the right output terminal of a flip-flop 318. Similarly, other input terminals of the "and" networks 305 and 311 are connected to the left output terminal of the flip-flop 318.

The output lead 290 from the comparator 266 is also connected to the left input terminal of a flip-flop 328. The left output terminal of the flip-flop 328 is connected to an input terminal of an "and" network 301 having another input terminal connected to the left output terminal of the one-shot multivibrator 322. The left input terminal of the multivibrator 322 is connected through the lead 291 in FIGURES 5A and 5B to the output terminal of the differentiator 107. The multivibrator 322 may be constructed in a manner similar to that disclosed on pages 2-44 to 2-58 inclusive, of "Principles of Radar" (second edition), published by the members of the staff of the Massachusetts Institute of Technology.

The output terminal of the "and" network 301 is connected to one input terminal of an "or" network 397. Another input terminal of the "or" network 397 has a common connection with the output terminal of a differentiator 332, the input terminal of which receives signals passing through a capacitance 333 from the stationary contact of the switch 314. Signals pass through the "or" network 397 and through a lead 295 in FIGURES 5B and 5A to the left input terminal of the flip-flop 258 in FIGURE 5A.

In addition to passing to the "or" network 397, the output signals from the "and" network 301 are introduced to the right input terminal of the flip-flop 328 and to an input terminal of an "or" network 358. A second input terminal of the "or" network 358 is connected through the lead 293 to the output terminal of the differentiator 332. Connections are made from the output terminal of the "or" network 358 to the right input terminal of the flip-flop 335 and to the left input terminal of a flip-flop 360. The signals from the "or" network 358 also pass to the input terminal of a delay line 364 having its output terminal connected to the right input terminal of the flip-flop 360.

The left output terminal of the flip-flop 360 is connected to the control grid of a vacuum tube 366. The control grid of the tube 366 is negatively biased through a grid resistor 368 from the biasing source C—. The cathode of the tube 366 is grounded and the anode of the tube is connected to one terminal of the arm 114, which is also shown in FIGURE 1. The other terminal of the arm 114 is connected to the stationary contact of the switch 314.

The right output terminal of the flip-flop 258 (FIGURE 5A) is connected thorugh the lead 289 in FIGURES 5A and 5B to input terminals of "and" networks 304, 306 and 308 in FIGURE 5B. In like manner, the voltage on the left output terminal of the flip-flop 258 is introduced through the lead 287 in FIGURES 5A and 5B to input terminals of "and" networks 302, 310 and 312. Signals respectively pass to second input terminals of the "and" networks 302 and 308, the "and" networks 304 and 310 and the "and" networks 306 and 312 through the leads 290, 292 and 294 (FIGURES 5A and 5B) from the comparator 266 in FIGURE 5A. The output signals from the "and" networks 302, 304 and 306 (FIGURE 5B) are introduced through an "or" network 393 to the left input terminal of the flip-flop 318. In like manner, the output signals from the "and" networks 308, 310 and 312 pass through an "or" network 395 to the right input terminal of the flip-flop 318.

The bottom horizontal row of the card 10 in FIGURE 5A may have an indication of "1" in each position. These indications of "1" are read by the head 122 and are amplified by the amplifier 180. The amplified pulses are then introduced as negative pulses to the left input terminal of the flip-flop 188. Each negative pulse from the amplifier 180 triggers the flip-flop 188 to produce a relatively high voltage on the left output terminal of the flip-flop.

After a certain time and before the introduction of the next negative pulse, the first pulse from the amplifier 180 passes through the delay line 196 to the right input terminal of the flip-flop 188. This signal triggers the flip-flop 188 so as to produce a return of the flip-flop to its original state of operation, as represented by a relatively high voltage on the right output terminal of the flip-flop and a relatively low voltage on the left output terminal of the flip-flop. In this way, the flip-flop 188 can be triggered by each pulse from the implifier 180 to produce a sequence of "clock" pulses representing the movement of successive vertical columns on the card 10 past the heads 124, 126 and 128.

Each time that the voltage on the left output terminal of the flip-flop 188 changes from a high level to a low level, the count in the binary counter 222 is increased by an integer. The binary counter 222 is constructed in a known manner to provide a different pattern of operation for each count. For example, the counter 222 may be formed by a plurality of flip-flops connected in a cascade arrangement to provide an individual pattern of operation for the different numbers of clock signals.

The indications are shown in FIGURE 5A as being introduced to the compare network 218 from the upper one of the two output leads from the counter. Actually, the upper output lead from the counter 222 in FIGURE 5A may represent a plurality of leads from the different flip-flops in the counter and the output lead from the selector 220 may represent a plurality of output leads. A signal is able to pass through the compare network 218 only when the signals on the output leads from the flip-flops in the counter 222 correspond to the signals from the selector 220, which may be manually set to provide indications of any value.

In this way, a signal can pass through the compare network 218 only when the information in a particular vertical column on each card 10 is being read by the heads 124, 126 and 128. The operation of the counter 222, the selector 220 and the compare network 218 in passing a signal only for a particular vertical column of each card is described in considerable detail in co-pending application Serial No. 566,404, filed February 20, 1956, by Jerome B. Wiener.

The heads 124, 126 and 128 in FIGURE 5A produce pulses in accordance with the magnetic information recorded on the different vertical columns of the cards 10. For example, the heads 124, 126 and 128 produce pulses representing a pattern of "1-0-1" for the first vertical column of the card illustrated in FIGURE 5A, where the least significant digit is at the right. In the next vertical column, the heads 124, 126 and 128 produce pulses representing a pattern of "0-1-0" and in the third vertical column the heads produce pulses representing a pattern of "0-1-1," where the least significant digit is at the right. In this discussion, the head 126 will be considered as producing signals representing the value of a binary digit having a greater numerical significance than the value of the binary digit represented by the signals induced in the head 124. Similarly, the signals induced in the head 128 will be considered as having a greater binary significance than the signals induced in the head 126.

The positive pulses from the heads 124, 126 and 128 are amplified and inverted by the amplifiers 182, 184 and 186 and are introduced as negative triggering signals to the left input terminals of the flip-flops 190, 192 and 194, respectively. These signals trigger the flip-flops 190, 192 and 194 into the "true" state of operation, as represented by relatively high voltages on the left output terminals of the flip-flops. The negative pulses induced in the heads 124, 126 and 128 to represent indications of "0" are also amplified and inverted by the amplifiers 182, 184 and 186. The resulting positive pulses are inverted in polarity by the inverters 198, 200 and 202. The resultant signals of negative polarity are introduced to the right input terminals of the flip-flops 190, 192 and 194 to trigger the flip-flops into the "false" states of operation, as represented by relatively high voltages on the right output terminals of the flip-flops. This means that the flip-flops 190, 192 and 194 are triggered into "true" or "false" states of operation in a pattern dependent upon the information contained in successive vertical columns of each card 10 as the card moves past the heads. As previously described, although three such heads are shown, more heads can be used so that the number of heads will correspond to the number of horizontal rows of information on the cards.

The signals on the left and right output terminals of the flip-flops 190, 192 and 194 are introduced to the "and" networks 206, 208, 210, 212, 214 and 216. Since the "and" networks 206, 208, 210, 212, 214 and 216 have second input terminals connected to the output terminals of the compare network 218, the "and" networks are conditioned to pass signals only upon the production of an output pulse from the compare network. As previously noted, the compare network 218 operates to pass a signal only after a selected number of vertical columns on each card 10 has moved past the transducer heads 122, 124, 126 and 128. Therefore, the "and" networks 206, 208, 210, 212, 214 and 216 are conditioned to pass the signals from the flip-flops 190, 192 and 194 only for a particular vertical column in each card, the particular vertical column being dependent upon the setting of the selector 220.

The output signals from the "and" networks 206, 208, 210, 212, 214 and 216 are introduced to the bank of "and" networks formed by the networks 246, 248, 250, 252, 254 and 256 and to the bank of "and" networks formed by the networks 270, 272, 274, 276, 278 and 280. The operation of these banks of "and" networks is controlled by the flip-flop 258 so that only one bank is conditioned to pass signals at any time. For example, the bank formed by the "and" networks 246, 248, 250, 252, 254 and 256 passes a signal upon the occurrence of a relatively high voltage on the right output terminal of the flip-flop 258. However, the bank formed by the "and" networks 270, 272, 274, 276, 278 and 280 becomes opened for the passage of signals when a relatively high voltage is produced on the left output terminal of the flip-flop.

The signals passing through the "and" networks 246, 248, 250, 252, 254 and 256 are respectively introduced to the right and left input terminals of the flip-flops 260, 262 and 264, the introduction of the signals to the right input terminals of the flip-flops being through the "or" networks 247, 251 and 255. The signals trigger the flip-flops 260, 262 and 264 into a pattern of operation corresponding to the pattern of the flip-flops 190, 192 and 194. In like manner, the signals passing through the "and" networks 270, 272, 274, 276, 278 and 280 are introduced to the right and left input terminals of the flip-flops 284, 286 and 288. These signals trigger the flip-flops 284, 286 and 288 into a pattern operation corresponding to the pattern of the flip-flops 190, 192 and 194.

Since the signals can pass to the flip-flops 260, 262 and 264 or to the flip-flops 284, 286 and 288 only for a particular vertical column in each card 10, only one of the two groups of these flip-flops can receive information for any one card. The other group of these flip-flops remains in its previous state of operation as set by information derived from the preceding card. Therefore, by the appropriate control of the flip-flop 258, the information in a particular vertical column on any one card may be stored in one bank of the flip-flops and the information from a corresponding vertical column of a succeeding card can be stored in the other group of these flip-flops for purposes of comparison.

The signals from the flip-flops 260, 262 and 264 and from the flip-flops 284, 286 and 288 are introduced to the comparator 266. The comparator 266 compares the voltages introduced to it from the flip-flops 260, 262, 264 and the flip-flops 284, 286 and 288 and determines whether the number stored in one group is less than, equal to or greater than the number stored in the other group (assuming that the information stored represents numerical values). Similarly, the comparator 266 may operate to determine if an alphabetical letter stored in one group precedes, corresponds to, or follows an alphabetical letter stored in the other group. The comparator 266 may also operate upon other information than numbers or letters.

When numerical information is stored on the cards 10, the comparator 266 operates to produce a pulse on its output lead 294 when the signal information produced in the flip-flops 284, 286 and 288 has a numerical value greater than the value of the signal information stored in the flip-flops 260, 262 and 264. A signal is produced in the output line 294 in accordance with the logical equation:

$$X = [j_2^1 i_3 + (j_3 i_3 + j_3^1 i_3^1)\{j_2^1 i_2 + (i_2 j_2 + i_2^1 j_2^1) j_1^1 i_1\}] \quad (1)$$

where:

$j_1$ = a relatively high voltage on the left output terminal of the flip-flop 260;

$j_1^1$ = a relatively high voltage on the right output terminal of the flip-flop 260;

$j_2$ and $j_3$ = relatively high voltages on the left output terminals of the flip-flops 262 and 264, respectively.

$j_2^1$ and $j_3^1$ = relatively high voltages on the right output terminals of the flip-flops 262 and 264, respectively;

$i_1$, $i_2$ and $i_3$ = relatively high voltages on the left output terminals of the flip-flops 284, 286 and 288, respectively.

$i_1^1$, $i_2^1$ and $i_3 1$ = relatively high voltages on the right output terminals of the flip-flops 284, 286 and 288, respectively;

"+" = an "or" proposition in which a signal is produced when any of the two or more propositions covered by the "or" proposition is true; and $X$ = a signal on the line 294 to indicate that the number stored in the flip-flops 284, 286 and 288 is greater than the number stored in the flip-flops 260, 262 and 264.

In like manner, a pulse is produced by the comparator on the output lead 290 when the information stored in the flip-flops 284, 286 and 288 has a numerical value less than the value of the signal information stored in the flip-flops 260, 262 and 264. The introduction of signals from the comparator 266 to the line 290 may be logically expressed as:

$$Y = [j_3 i_3^1 + (j_3 i_3 + j_3^1 i_3^1\{j_2 i_2^1 + (i_2 j^2 + i_2^1 j_2^1) j_1 i_1^1\}] \quad (2)$$

where:

$Y$ = a signal on the line 290 to indicate that the number stored in the flip-flops 260, 262 and 264 is greater than the number stored in the flip-flops 284, 286 and 288.

The comparator 266 also produces a pulse on the output lead 292 when the numerical information represented by the signals stored in the flip-flops 260, 262 and 264 is the same as the information stored in the flip-flops 284, 286 and 288. This pulse may be produced in accordance with the logical equation:

$$Z=(i_3j_3+i_3^1j_3^1)(i_2j_2+i_2^1j_2^1)(i_1j_1+i_1^1j_1^1) \quad (3)$$

where:

$Z$ = a signal on the line 292 to indicate that the number stored in the flip-flops 260, 262 and 264 is equal to the number stored in the flip-flops 284, 286 and 288.

The operation of the system shown in FIGURES 5A and 5B may probably be understood best from a discussion of specific examples. When the switch 314a in FIGURE 5B is manually closed, a transient surge of current flows through the capacitor 333 to charge the capacitor. This current passes to the differentiator 332, which steepens the leading edge of the transient surge of current to produce a positive triggering pulse on the lead 293. The pulse from the differentiator 332 passes through the "or" network 397 and the lead 295 in FIGURES 5B and 5A to the left input terminal of the flip-flop 258 in FIGURE 5A to trigger the flip-flop to the "true" state of operation, as represented by a relatively high voltage on the left output terminal of the flip-flop. This causes the "and" networks 270, 272, 274, 276, 278 and 280 to become prepared for the passage of a signal and prevents the "and" networks 246, 248, 250, 252, 254 and 256 from becoming operative.

The triggering pulse on the lead 293 (FIGURES 5B and 5A) also passes through the "or" network 207 in FIGURE 5A to trigger the flip-flop 217 to the false state for the production of a relatively high voltage on the right output terminal of the flip-flop. This voltage is impressed on input terminals of the "and" networks 206, 208, 210, 212, 214 and 216 to help in conditioning the "and" networks for the passage of signals through the networks.

The triggering pulse on the lead 293 also passes through the "or" network 358 in FIGURE 5B to the right input terminal of the flip-flop 335 and the left input terminal of the flip-flop 360. The signal triggers the flip-flop 335 to the false state of the flip-flop as represented by a relatively high voltage on the right output terminal of the flip-flop. The signal also triggers the flip-flop 360 to produce a relatively high voltage on the left output terminal of the flip-flop.

The high voltage produced on the left output terminal of the flip-flop 360 is introduced to the grid of the tube 366 to render the tube conductive. When the tube 366 becomes conductive, current flows through the arm 114 such that a magnetic field is produced. This magnetic field co-operates with the magnetic field produced by the magnet 18 in moving the arm 114 in a direction for interrupting the vacuum force exerted by the retainer 15 (FIGURE 1). Since the vacuum force exerted by the retainer 15 becomes cut off, the vacuum and frictional forces exerted on the card by the drum 20 become predominant. This enables the drum 20 to withdraw a card from the stack 14 to the peripheral channel of the drum. When the card becomes positioned on the periphery of the drum 20, it is held in fixed position on the drum periphery by the vacuum force exerted on the card through the slots 29, as discussed previously. The particular card removed by the drum 20 is the first card in the stack 14 and is designated as 10a (14).

The triggering pulse from the "or" network 358 also passes through the delay line 364 to the right input terminal of the flip-flop 360. This signal triggers the flip-flop 360 to return the flip-flop to the false state of operation after a particular interval of time. The time delay provided by the line 364 corresponds to the time required to remove one card completely or at least partially from the stack 14. When the flip-flop 360 becomes triggered to its false state at the end of the time delay, the tube 366 is returned to its non-conductive state. This causes the arm 114 to return to the position blocking the aperture 23 such that a vacuum force is re-established by the retainer 15 against the cards 10 in the input stack 14. This vacuum force prevents the next card in the input stack 14 from being withdrawn by the drum 20 from the stack.

Upon removal of the card 10a (14) from the input stack 14 by the drum 20, the card travels with the drum past the heads 122, 124, 126 and 128. When the particular vertical column in the card 10a (14) corresponding to the position selected by the selector 220 is reached, the compare network 218 impresses a positive pulse on the "and" networks 206, 208, 210, 212, 214 and 216. This causes the signals from the flip-flops 190, 192 and 194 to pass through the "and" networks 206, 208, 210, 212, 214 and 216 in FIGURE 5A.

Since the "and" networks 270, 272, 274, 276 and 278 have been prepared for opening by a relatively high voltage on the left output terminal of the flip-flop 258, the signals from the "and" networks 206, 208, 210, 212, 214 and 216 pass through the "and" networks 270, 272, 274, 276, 278 and 280 to the flip-flops 284, 286 and 288. The signals from the "and" networks 270, 272, 274, 276, 278 and 280 trigger the flip-flops 284, 286 and 288 into a pattern of operation corresponding to the pattern of the signals from the "and" networks. This causes the flip-flops 284, 286 and 288 to represent the operational states of the flip-flops 190, 192 and 194 for the selected vertical column of the card 10a (14). It will be assumed that the information in the selected vertical column represents a number having a decimal value of "2" as represented by a binary pattern "010," where the least significant digit is at the right. Because of this, the flip-flops 284 and 288 become triggered to their false states and the flip-flop 286 becomes triggered to its true state.

The triggering signal initially produced by the differentiator 332 also passes through the lead 293 in FIGURES 5B and 5A and the "or" networks 247, 251 and 255 (FIGURE 5A) to the right input terminals of the flip-flops 260, 262 and 264. This signal triggers the flip-flops 260, 262 and 264 to the "false" states of operation of the flip-flops as represented by relatively high voltages on the right output terminals of the flip-flops. This pattern of operation of the flip-flops 260, 262 and 264 represents a number having a decimal value of "0." Therefore, the flip-flops 284, 286 and 288 initially represent a decimal value of "2" and the flip-flops 260, 262 and 264 represent a selected standard such as a decimal value of "0." This causes a pulse to be introduced by the comparator 266 to the output lead 294, since the representation provided by the flip-flops 284, 286 and 288 is numerically greater than the representation provided by the flip-flops 260, 262 and 264. This is in accordance with the logic expressed above in Equation 1.

The pulse on the lead 294 passes to the "and" networks 306 and 312. However, only the "and" network 312 is conditioned for the passage of a signal because of the production of a relatively high voltage on the left output terminal of the flip-flop 258. Because of this, the pulse on the lead 294 passes through the "and" network 312 and the "or" network 395 to the right input terminal of the flip-flop 318. This pulse triggers the flip-flop 318 to the false state of the flip-flop. By triggering the flip-flop 318 to the false state of operation, the "and" networks 307, 309, 313 and 315 become triggered for the passage of signals but the "and" networks 305 and 311 become closed against the passage of any signals.

The pulse on the lead 294 also passes to the line 320 which delays the pulse for a period of time required for the card 10a (14) to move from the heads 122, 124, 126 and 128 past the stack 181 to the output stack 174. The pulse is then introduced to the "and" networks 305, 307 and 309. The pulse from the delay line 320 is unable to pass through the "and" network 305 because of the introduction of a relatively low voltage to the "and" network from the left output terminal of the flip-flop 318. The pulse from the delay line 320 is also unable to pass through the "and" network 307 since a relatively low voltage is introduced to the "and" network from the left output terminal of the flip-flop 335.

The pulse from the delay line 320 is able to pass through the "and" network 309 to the delay line 323. Because of the delay previously provided by the line 320, the pulse passes through the "and" network 309 to the delay line 323 at the time that the card 10a (14) is reaching the output stack 174. The delay line 323 then operates to delay the pulse for a period of time corresponding to the movement of the card between the heads 122, 124, 126 and 128 and the output stack 181. In this way, the pulse is able to pass to the "or" network 327 only at a time well after the time at which the card 10a (14) has moved past the output stack 174. Because of this, the card 10a (14) cannot become transferred to the output stack 174 even though the lifter 90 in FIGURE 1 becomes activated upon the passage of a signal through the "or" network 327. The activation of the lifter 90 upon the passage of a signal through the "or" network 327 will be described in detail subsequently.

The pulse on the lead 294 is also introduced through the "or" network 324 to the left input terminal of the flip-flop 326. This pulse triggers the flip-flop 326 for the production of a relatively high voltage on the left output terminal of the flip-flop. This voltage is impressed on the "and" network 303 to prepare the "and" network for activation at the time that the card 10a (14) is moving past the sensor 103. As the card 10a (14) moves past the sensor 103, it contacts the finger 103a on the sensor and produces a movement of the sensor in a direction to close the switch 105. This establishes a continuous circuit to the capacitor 109 in FIGURE 5A and causes a surge of current to flow through the capacitor from the battery 111. This current surge is differentiated by the stage 107 to produce a sharp signal on the line 291. The signal on the line 291 is introduced to the left input terminal of the one-shot multivibrator 322 to trigger the multivibrator to a true state as represented by a relatively high voltage on the left output terminal of the multivibrator.

Because of the operating characteristics of the one-shot multivibrator 322, a relatively high voltage continues on the left output terminal of the multivibrator only for a particular period of time. At the end of this time, the multivibrator 322 returns to its false state of operation without any further introduction of triggering signals to the multivibrator. However, during the time that the multivibrator 322 is in its true state, a signal passes through the "and" network 303 since the "and" network has been previously prepared for activation by a relatively high voltage on the left output terminal of the flip-flop 326. A relatively high voltage has previously been produced on the left output terminal of the flip-flop 326 by the passage of a triggering signal through the line 294 to the left input terminal of the flip-flop. The signal passing through the "and" network 303 triggers the flip-flop 326 to the false state of operation so as to prevent any further signals from passing through the "and" network.

The signal from the "and" network 303 is also introduced to the left input terminal of the flip-flop 334 to trigger the flip-flop to the true state of operation. The resultant high voltage produced on the left output terminal of the flip-flop 334 causes the tube 338 to become conductive such that current flows through the tube and the arm 102. Upon the flow of current through the arm 102, the arm becomes pivotally displaced from the aperture corresponding to the apertures 23 in FIGURE 3 so as to interrupt the vacuum force produced at the retainer 15a. The vacuum and friction forces exerted by the drum 20 on the first card in the stack 12 then become predominant so as to obtain a withdrawal of the card by the drum from the stack. The card withdrawn from the input stack 12 is ahead of the card previously withdrawn from the input stack 14. The card withdrawn from the input stack 12 may be designated as "10a (12)."

The pulse from the "and" network 303 also passes through the delay line 336 to the right input terminal of the flip-flop 334 after a particular period of time. This pulse triggers the flip-flop 334 to the false state of operation so as to produce an interruption in the flow of current through the tube 338. The tube 338 becomes cut off at such a time that only the card 10a (12) is able to be withdrawn by the drum 20 from the input stack 12.

The output pulse from the "and" network 303 is also introduced through the lead 297 in FIGURES 5B and 5A to the right input terminal of the flip-flop 258 in FIGURE 5A. This pulse triggers the flip-flop 258 to the false state of operation such that the bank formed by the "and" networks 246, 248, 250, 252, 254 and 256 becomes conditioned for the passage of signals instead of the bank formed by the "and" networks 270, 272, 274, 276, 278 and 280.

The actuation of the sensing arm 103 by the card 10a (14) also causes the flip-flop 217 in FIGURE 5A to become triggered to the false state of operation by the passage of a pulse through the lead 291 and through the "or" network 207. By triggering the flip-flop 217 to the false state of operation, the "and" networks 206, 208, 210, 212, 214 and 216 become conditioned for the passage of signals. Therefore, as the card 10a (12) moves past the heads 122, 124, 126 and 128, the information at the selected vertical column on the card passes through the "and" networks 206, 208, 210, 212, 214 and 216. The information at the selected position on the card 10a (12) passes through the "and" networks 246, 248, 250, 252, 254 and 256 to the flip-flops 260, 262 and 264 because of the high voltage on the right output terminal of the flip-flop 258. By way of illustration, the signals produced in the flip-flops 260, 262 and 264 may have a pattern such as "0–0–1," where the least significant digit is at the right. The flip-flops 260, 262 and 264 respectively produce the indications of "1," "0" and "0" to represent the digits of increasing significance. This pattern of signal indications represents a decimal value of "1."

As has been previously described, the flip-flop 217 is in its false state of operation at the time that the card 10a (12) moves past the heads 122, 124, 126 and 128. This prepares the "and" networks 206, 208, 210, 212, 214 and 216 for the passage of signal information at a selected vertical column on the card 10a (12). As the successive vertical columns on the card 10a (12) move past the heads 122, 124, 126 and 128, the vertical columns are counted by the counter 222. When the last vertical column on the card 10a (12) moves past the heads 122, 124, 126 and 128, a signal is produced by the counter 222 and is introduced to the "and" networks 203 and 205. The signal is introduced to the "and" networks 203 and 205 through the lower of the two output lines shown as extending from the counter 222 in FIGURE 5A. A signal is produced on this line only for the last vertical column of each card because of the particular connections from the flip-flops in the counter.

The signal from the counter 222 passes through the "and" network 203 because the "and" network has been prepared for activation by a relatively high voltage on the right output terminal of the flip-flop 217. The signal passing through the "and" network 203 triggers the flip-flop 217 to the true state of operation. The resultant relatively low voltage on the right output terminal of the flip-flop 217 prevents any signals from passing through the "and" networks 206, 208, 210, 212, 214 and 216. In this way, the information at the selected vertical column on the card 10a (14) cannot pass through the "and" networks 206, 208, 210, 212, 214 and 216. This is desirable since the information at the selected vertical column on the card 10a (14) has previously been stored in the flip-flops 284, 286 and 288.

As the card 10a (14) moves past the heads 122, 124, 126 and 128, the vertical columns on the card are counted by the counter 222. At the last vertical column on the card 10a (14), a signal is produced by the counter 222 and is introduced to the "and" networks 203 and 205. The signal passes through the "and" network 205 since the "and" network has been prepared for opening by the high voltage on the left output terminal of the flip-flop 217. The signal triggers the flip-flop 217 to the false state of operation such that the "and" networks 206, 208, 210, 212, 214 and 216 become prepared for the passage of signal information at the selected vertical column on the next card.

The pattern of signals produced in the flip-flops 260, 262 and 264 is compared in the comparator 266 with the pattern of signals previously produced in the flip-flops 284, 286 and 288 to represent a decimal value of "2." Since the decimal value "1" now indicated by the flip-flops 260, 262 and 264 is still less than the decimal value "2" indicated by the flip-flops 284, 286 and 288, the output pulse produced by the comparator 266 again appears on the output lead 294. This is in accordance with the logic expressed above in equation 1.

Since the flip-flop 258 has been triggered to its false state of operation, the flip-flop now produces a relatively high voltage on the lead 289 and a relatively low voltage on the lead 287. This causes the "and" networks 304, 306 and 308 in FIGURE 5B to become conditioned for the passage of signals. Since the "and" network 306 also receives the pulses on the lead 294, the pulse on the lead 294 passes through the "and" network. The pulse then passes through the "or" network 393 to the left input terminal of the flip-flop 318 and triggers the flip-flop to the true state of the flip-flop, as represented by a relatively high voltage on the left output terminal of the flip-flop. This high voltage prepares the "and" networks 305 and 311 for activation but prevents the "and" networks 307, 309, 313 and 315 from becoming activated.

The pulse produced on the lead 294 by the comparator 266 also passes through the delay line 320 to the "and" networks 305, 307 and 309. Because of the characteristics of the delay line 320, the pulse passes through the delay line to the "and" network 305 at the time that the card 10a (12) is reaching the output stack 174. As noted above, the "and" network 305 is conditioned by the flip-flop 318 to pass this pulse. After passing through the "and" network 305, the pulse is introduced through the "or" network 327 to the left input terminal of the flip-flop 348.

The flip-flop 348 is triggered to the true state of operation by the pulse passing through the "or" network 327 such that a high voltage appears at its left output terminal. This high voltage causes the tube 352 to become conductive. When the tube 352 becomes conductive, the solenoid 98 becomes energized so as to produce an opening of the valve 96. This causes air under pressure to pass into the lifter 90 and through the holes 92a in the lifter. The air leaves the holes 92a in a jet stream with a sufficient force for removing the card 10a (12) from the drum. When the card 10a (12) becomes removed from the drum, it becomes positioned on the throat member 91 for movement into the output stack 174.

The pulse passing through the "or" network 327 also travels through the delay line 350 to trigger the flip-flop 348 to the false state of operation, as represented by a relatively low voltage on the left output terminal of the flip-flop. The flip-flop 348 becomes triggered to its false state of operation after the card 10a (12) has been transferred to the output stack or at least after the leading edge of the card has been lifted on the throat member 91. When the flip-flop 348 becomes triggered to its false state, the tube 352 becomes nonconductive so as to cut off the vacuum force in the lifter 90 and so as to prevent any further transfer of cards to the output stack 174. As will become more apparent subsequently, the movement of the card 10a (12) to the output stack 174 is in accordance with the desired pattern of operation. The reason for this is that all of the cards in the stack 12 not having information corresponding to the information in the selected vertical column of the cards in the input stack 14 are to be collected in the output stack 174.

In addition to being introduced to the "and" networks 306 and 312 and to the delay line 320, the signal on the line 294 passes through the "or" network 324 to the left input terminal of the flip-flop 326. The signal triggers the flip-flop 326 to the true state such that the "and" network 303 becomes prepared for activation. When the card 10a (14) reaches the sensor 103, it acts upon the sensor to close the switch 105. This causes a triggering signal to be introduced to the multivibrator 322 for the production of a relatively high voltage on the left output terminal of the multivibrator. This high voltage causes a signal to pass through the "and" network 303.

The signal passing through the "and" network 303 is introduced to the right input terminal of the flip-flop 326 to trigger the flip-flop to the false state of operation of the flip-flop. This prevents any further signals from passing through the "and" network 303. The signal passing through the "and" network 303 is also introduced to the flip-flop 334 to trigger the flip-flop to the true state of operation. The resultant high voltage on the left output terminal of the flip-flop 334 makes the tube 338 conductive such that current flows through a circuit including the tube and the arm 102. This current produces a pivotal movement of the arm 102 such that the vacuum force exerted by the retainer 15a in FIGURE 1 becomes interrupted.

Upon the interruption in the vacuum force exerted by the retainer 15a, the next card in the input stack 12 becomes withdrawn from the stack by the drum 20. This card may be designated as "10b (12)." The card 10b (12) becomes transferred to the periphery of the drum 20 to replace the card 10a (12) previously deposited in the output stack 174. In this way, the new card transferred to the drum 20 is obtained from the same input stack as the card transferred to the output stack 174. Only the card 10b (12) becomes transferred to the drum 20 since the flip-flop 334 becomes triggered to its false state by the passage of the pulse from the "and" network 303 through the delay line 336. The card 10b (12) is positioned ahead of the card 10a (14) on the drum 20 by a distance corresponding to the distance between the finger 103a and the input stack 12.

The relatively high voltage from the "and" network 303 also passes through the lead 297 in FIGURES 5B and 5A to the right input terminal of the flip-flop 258. However, the pulse has no effect on the flip-flop 258 because the flip-flop already has a relatively high output voltage on its right output terminal. The high voltage on the right output terminal of the flip-flop 258 is introduced through the lead 289 to the "and" networks 304, 306 and 308 to condition the networks for the passage of signals. The pulse from the "and" network 303 is also impressed on the left input terminal of the flip-flop 335, causing the flip-flop to produce a relatively high voltage on its left output terminal. The high voltage on the left output terminal of the flip-flop 335 conditions the "and" networks 307 and 313 for the passage of signals.

Actuation of the sensing arm 103 also causes the flip-flop 217 to be returned to the false state of operation. In the false state of operation, the flip-flop 217 conditions the "and" networks 206, 208, 210, 212, 214 and 216 for the passage of signals. The card 10b (12) now circulates with the drum 20 past the heads 122, 124, 126 and 128. At the selected vertical column on the card 10b (12), the signals from the flip-flops 190, 192 and 194 are passed through the "and" networks 206, 208, 210, 212, 214 and 216 to the "and" networks 246, 248, 250, 252, 254, 256. Because of the relatively high voltage on the right output terminal of the flip-flop 258, the signals from the flip-flops 190, 192 and 194 pass through the "and" networks 246, 248, 250, 252, 254, 256 to the flip-flops 260, 262 and 264.

The flip-flops 260, 262 and 264 are triggered into a pattern of operation corresponding to the information at the selected vertical column on the card 10b (12). The new signals produced in the flip-flops 260, 262 and 264 replace the signals previously stored in the flip-flops by the card 10a (12). By way of illustration, the signals produced in the flip-flops 260, 262 and 264 by the card 10b (12) may have a pattern "0–1–0" to indicate a decimal value of "2." For such a pattern of operation, the flip-flops 260, 262 and 264 respectively produce indications of "0," "1" and "0" to represent the digits of increasing significance.

The pattern of operation produced in the flip-flops 260, 262 and 264 by the card 10b (12) is identical to the pattern of operation previously produced and still existing in the flip-flops 284, 286 and 288. The same pattern of operation still exists in the flip-flops 284, 286 and 288 because of the operation of the counter 222, the "and" network 203 and the flip-flop 217 in closing the "and" networks 206, 208, 210, 212, 214 and 216 during the time that the card 10a (14) is moving past the heads 122, 124, 126 and 128. Since the information in the flip-flops 260, 262 and 264 corresponds to the information in the flip-flops 284, 286 and 288, the comparator 266 operates to introduce a pulse to the output lead 292. This is in accordance with the logic expressed in Equation 3.

The pulse on the lead 292 passes through the "and" network 304, which has been prepared for opening by the relatively high voltage on the right output terminal of the flip-flop 258, as previously described. The pulse then passes through the "or" network 393 to the left input terminal of the flip-flop 318. This pulse has no effect on the flip-flop 318 since the flip-flop already has a relatively high voltage on the left output terminal of the flip-flop. Therefore, the "and" networks 305 and 311 are still conditioned for the passage of signals and the "and" networks 307, 309, 313 and 315 remain closed against the passage of signals.

The pulse on the lead 292 is also introduced through the "or" network 314 and the delay line 316 to the "and" networks 311, 313 and 315. Of these, however, only the "and" network 311 is conditioned by the flip-flop 318 for the passage of signals. Because of this, the pulse passes through the "and" network 311 and through the "or" network 325 to trigger the flip-flop 349. The delay in the line 316 is such that the flip-flop 349 is triggered to render the tube 353 conductive at the time that the card 10b (12) is reaching the output stack 181.

When the tube 353 becomes conductive, the solenoid 179 becomes energized such that air under pressure is introduced to the lifter 90a. This causes the card 10b (12) to become lifted to the throat member 91a for deposit in the output stack 181. The deposit of the card 10b (12) in the output stack 181 is desired since the card has information at its selected vertical column corresponding to the information on the selected vertical column of the card 10a (14). In this way, certain cards from the input stack 12 become deposited in the output stack 181 to become mixed in the output stack in the proper sequence with all of the cards from the input stack 14.

The pulse introduced from the comparator 266 to the lead 292 also passes through the "or" network 324 in FIGURE 5B to the flip-flop 326 to produce a relatively high voltage on the left output terminal of the flip-flop. This voltage is applied to the "and" network 303 to prepare the "and" network for opening. The "and" network 303 actually becomes opened to pass a signal when the card 10a (14) moves past the sensor 103. The "and" network 303 passes a signal at this time since the multivibrator 322 becomes triggered to its true state upon the actuation of the sensor 103, as previously described.

The signal passing through the "and" network 303 is introduced to the right input terminal of the flip-flop 326 to trigger the flip-flop to the false state of operation. The signal is also impressed on the left input terminal of the flip-flop 334 to obtain the withdrawal of the next card from the input stack 12 to the drum 20. This card may be designated as 10c (12). The card 10c (12) becomes positioned on the drum 20 by a distance ahead of the card 10a (14) corresponding to the distance between the input stack 12 and the finger 103a of the sensor 103.

The pulse from the "and" network 303 is also impressed on the left input terminal of the flip-flop 335. This signal has no effect on the flip-flop 335 since the flip-flop is already in its true state of operation, as represented by a high voltage on the left output terminal of the flip-flop. This high voltage conditions the "and" networks 305 and 311 for the passage of signals. The flip-flop 258 also remains in its false state of operation since the signal from the "and" network 303 is introduced through the lead 297 to the right input terminal of the flip-flop.

As the card 10a (14) actuates the sensing arm 103, the flip-flop 217 is again triggered to condition the "and" networks 206, 208, 210, 212, 214 and 216 for the passage of signals. In a manner similar to that described previously, the information at the selected vertical column on the card 10c (12) is passed by the "and" networks 206, 208, 210, 212, 214 and 216 to the flip-flops 260, 262 and 264. The information at the selected vertical column on the card 10c (12) replaces the information previously stored in these flip-flops by the card 10b (12). However, the information in the flip-flops 284, 286 and 288 is not changed since the "and" networks 206, 208, 210, 212, 214 and 216 become closed against the passage of signals after the movement of the card 10c (12) past the heads 122, 124, 126 and 128. This results from the triggering of the flip-flop 217 to the true state of operation as the last vertical column on the card 10c (12) moves past the heads 122, 124, 126 and 128.

The signals produced in the flip-flop 260, 261 and 264 by the card 10c (12) may have a pattern of "0–1–1," where the least significant digit is at the right. Such a pattern of operation represents a decimal value of "3." For such a pattern of operation, the flip-flops 260, 262 and 264 respectively produce signals of "1," "1" and "0" to represent binary digits of increasing significance. These signals are compared in the comparator 266 with the signals previously produced in the flip-flops 284, 286 and 288 to represent a decimal value of "2." Since the signals produced in the flip-flops 284, 286 and 288 have a numerical value less than the signals produced in the flip-flops 260, 262 and 264, an output pulse is produced by the comparator on the lead 290.

The pulse on the lead 290 is impressed on the "and" networks 308 and 302 in FIGURE 5B. Of these "and" networks, only the "and" network 308 is conditioned by the relatively high voltage on the right output terminal of the flip-flop 258 for the passage of signals. This causes the pulse on the line 290 to pass through the "and" network 308 and the "or" network 395 to the right input terminal of the flip-flop 318. This pulse triggers the flip-flop 318 such that a relatively high voltage is produced on the right output terminal of the flip-flop. The high voltage on the right output terminal of the flip-flop 318 conditions the "and" networks 307, 309, 313 and 315 for the passage of signals but closes the "and" networks 305 and 311 to prevent any passage of signals.

The pulse on the lead 290 is also introduced through the "or" network 314 and the delay line 316 to the "and" networks 311, 313 and 315. Of these "and" networks, only the networks 313 and 315 are conditioned by the high voltage on the right output terminal of the flip-flop 318 for the passage of signals. Of the "and" networks 313 and 315 only the network 313 is conditioned by the relatively high voltage on the left output terminal of the flip-flop 335 to pass signals. Therefore, the pulse on the lead 290 passes through the "and" network 313, the delay line 317 and the "or" network 325 to the left input terminal of the flip-flop 349. This pulse triggers the flip-flop 349 to the true state of operation so as to make the tube 353 conductive.

When the tube 353 becomes conductive, the lifter 90a becomes actuated. The lifter 90a becomes actuated at a time dependent upon the delay of the line 316 plus the additional delay of the line 319. These two time delays cause the lifter 90a to become actuated at the proper time for removing the trailing card 10a (14) rather than the leading card 10c (12). The transfer of the card 10a (14) from the drum 20 to the output stack 181 is proper since it is desired to deposit in the output stack 181 all of the cards originally obtained from the input stack 14. Instead of the card 10a (14) being circulated on the drum 20, the card 10c (12) circulates on the drum past the output stacks 174 and 181 and toward the sensing arm 103.

The pulse passing through the line 290 from the comparator 266 is also impressed on the left input terminal of the flip-flop 328 to produce a relatively high output voltage on the left output terminal of the flip-flop. The high voltage on the left output terminal of the flip-flop 328 is impressed on the "and" network 301 to prepare the "and" network for opening. This causes the "and" network 301 to pass a signal when the card 10c (12) actuates the sensor 103. The "and" network 301 passes a signal at this time since the multivibrator 322 is triggered to its true state upon the actuation of the sensor 103.

The signal passing though the "and" network 301 is introduced through the "or" network 358 to the flip-flop 360 to trigger the flip-flop 360 to the true state of operation. This causes the vacuum force in the retainer 15 to become interrupted in a manner similar to that described prevously so that the next card in the input stack 14 can be withdrawn by the drum 20 from the stack. This card may be designated as 10b (14). The card 10b (14) leads the card 10c (12) by a distance corresponding to the distance between the input stack 14 and the finger 103a of the sensor 103.

The signal from the "and" network 301 is also introduced through the "or" network 358 to the right input terminal of the flip-flop 335. The signal triggers the flip-flop 335 to the false state of operation for the production of a relatively high voltage on the right output terminal of the flip-flop. This high voltage conditions the "and" networks 309 and 315 for the passage of signals but closes the "and" networks 307 and 313 against the passage of any signals.

The pulse from the "and" network 301 is also impressed on the left input terminal of the flip-flop 258 through the "or" network 397 and the lead 295. This signal triggers the flip-flop 258 to the true state of operation such that a relatively high voltage is produced on the left output terminal of the flip-flop. By triggering the flip-flop 258 to the true state, a relatively high voltage is introduced to the lead 287 to condition the "and" networks 302, 310 and 312 for the passage of signals.

Upon the actuation of the sensing arm 103 by the card 10c (12), the flip-flop 217 becomes triggered to produce a relatively high voltage on its right output terminal. This high voltage conditions the "and" networks 206, 208, 210, 212, 214 and 216 for the passage of signals at the selective vertical column on the card 10b (14). As the card 10b (14) moves past the heads 122, 124, 126 and 128, the information at the selected vertical column on the card passes through the "and" networks 206, 208, 210, 212, 214 and 216. Because of the relatively high voltage on the left output terminal of the flip-flop 258, the information at the selective positive on the card 10b (14) passes through the "and" networks 270, 272, 274, 276, 278 and 280 to the flip-flops 284, 286 and 288. The operational states now produced in the flip-flops 284, 286 and 288 replace the operational states previously produced in the flip-flops to represent a decimal value of "2."

The operational states produced in the flip-flops 284, 286 and 288 by the card 10b (14) may have a pattern of "0–1–1," where the least significant digit is at the right. This pattern of operation may represent a decimal value of "3." Such a value is equal to the value previously stored and still remaining in the flip-flops 260, 262 and 264. Since the flip-flops 284, 286 and 288 have a pattern of operation corresponding to that of the flip-flops 260, 262 and 264, an output pulse signal is produced by the comparator on the lead 292.

The pulse on the lead 292 is impressed on the "and" networks 304 and 310. However, the pulse is passed only by the "and" network 310 since that network has been conditioned by the relatively high voltage on the left output terminal of the flip-flop 258 for the passage of signals. The pulse passing through the "and" network 310 is introduced through the "or" network 395 to the right input terminal of the flip-flop 318. This pulse does not change the state of operation of the flip-flop 318 since the flip-flop already has a relatively high voltage on its right output terminal. Because of the false state of operation of the flip-flop 318, the "and" networks 307, 309, 313 and 315 are conditioned for the passage of signals.

The pulse on the lead 292 also passes through the "or" network 314 to the delay line 316, which delays the pulse for a period of time corresponding to the time required for the card 10b (14) to move with the drum 20 to the output stack 181. The pulse then passes to the "and" networks 311, 313 and 315. Of these networks, only the networks 313 and 315 have been conditioned by the flip-flop 318 for the passage of signals. Of the "and" networks 313 and 315, only the network 315 has been conditioned by the relatively high voltage on the right output terminal of the flip-flop 335 to pass signals. This causes the pulse from the delay line 316 to pass through the "and" network 315 to the delay line 319, which delays the pulse for a period of time equal to the movement of the cards through a distance corresponding to the distances between the finger 103a and the input stack 14. This signal then passes through the "or" network 325 to the left input terminal of the flip-flop 349. The signal triggers the flip-flop 349 to the true state of operation so as to obtain a flow of air under pressure through the lifter 90a for removing a card from the drum 20.

Because of the delay provided by the lines 316 and 317, the lifter 90a becomes actuated at the time that the card 10c (12) is approaching the output stack 181. This causes the card 10c (12) from the input stack 12 to become transferred by the lifter 90a to the output stack 181. Such a transfer is proper because the card 10c (12) has information corresponding to that on a card from the input stack 14. As previously described, it is intended that the output stack 181 should receive all of the cards from the input stack 14 and particular cards from the input stack 12. The particular cards from the input stack 12 have information at the selected vertical column corresponding to the information at the selecter vertical column on the cards from the stack 14.

The card 10b (14) circulates with the drum 20 toward the finger 103a of the sensor 103 so as to actuate the sensor. When the card 10b (14) actuates the sensor 103, it causes the multivibrator 322 to be triggered to the true state of operation. This causes a pulse to pass through the "and" network 303, which has been previously prepared for opening by the production of a relatively high voltage on the left output terminal of the flip-flop 326. A relatively high voltage has been previously produced on the left output terminal of the flip-flop 326 by the passage of a pulse from the lead 292 through the "or" network 324 to the left input terminal of the flip-flop.

The pulse passing through the "and" network 303 actuates the flip-flop 334 to the true state of operation. In its true state of operation, the flip-flop 334 obtains an interruption in the vacuum force exerted by the retainer 15a such that the next card in the input stack 12 becomes transferred to the drum 20 from the stack. This card may be designated as 10d (12). As before, the pulse from the "and" network 303 is also impressed on the right input terminal of the flip-flop 326 to trigger the flip-flop to the false state of operation. In this way, only one of the cards in the input stack 12 can become transferred to the drum 20. The card 10d (12) leads the card 10b (14) by a distance corresponding to the distance between the input stack 12 and the finger 103a of the sensor 103.

The signal passing through the "and" network 303 is also introduced through the lead 297 to the right input terminal of the flip-flop 258. This signal triggers the flip-flop 258 so as to produce a relatively high voltage on the right output terminal of the flip-flop. The signal from the "and" network 303 is also impressed on the left input terminal of the flip-flop 335. The flip-flop 335 then becomes actuated so that its left output terminal receives a relatively high voltage and its right output terminal receives a relatively low voltage. This conditions the "and" networks 307 and 313 for the passage of signals and closes the "and" networks 309 and 315 against any passage of signals.

As the card 10d (12) circulates past the heads 122, 124, 126 and 128, the information at the selected vertical column on the card passes through the "and" networks 206, 208, 210, 212, 214 and 216. Because of the relatively high voltage on the right output terminal of the flip-flop 258, the information at the selected vertical column on the card 10d (12) passes through the "and" networks 246, 248, 250, 252, 254 and 256 to the flip-flops 260, 262 and 264. The information in the flip-flops 284, 286 and 288 remains unchanged since the "and" networks 206, 208, 210, 212, 214 and 216 become closed against the passage of signals after the card 10d (12) has moved past the heads 122, 124, 126 and 128. The "and" networks 206, 208, 210, 212, 214 and 216 become closed because of the production of a relatively low voltage on the right output terminal of the flip-flop 217 as the last vertical column on the card 10d (12) moves past the heads 122, 124, 126 and 128.

The information now stored in the flip-flops 260, 262 and 264 may have a decimal value of "3" so as to correspond to the information previously stored by the card 10b (14) in the flip-flops 284, 286 and 288. This causes an output pulse to be produced again by the comparator 266 for introduction to the lead 292. This pulse is passed by the "and" network 304 because of the relatively high voltage on the right output terminal of the flip-flop 258.

The pulse passing through the "and" network 304 is impressed on the left input terminal of the flip flop 318 to trigger the flip-flop for the production of a relatively high voltage on the left output terminal of the flip-flop. This high voltage conditions the "and" networks 305 and 311 for the passage of signals and closes the "and" networks 307 and 309 and the "and" networks 313 and 315 against the passage of signals.

The pulse on the lead 292 is also introduced through the "or" network 314 and the delay line 316 to the "and" networks 311, 313 and 315. Since only the "and" network 311 is conditioned for the passage of signals, the pulse passes through this network and through the "or" network 325 to the left input terminal of the flip-flop 349. This causes the lifter 90a to become actuated in the previously described manner. Since the delay line 316 interposes the only delay in the path of the pulse passing to the flip-flop 349, the lifter 90a becomes actuated at the proper time to transfer the leading card 10d (12) to the throat member 91a. In this way, the card 10d (12) becomes transferred to the output stack 181. This is in accordance with the desired pattern of operation even though the card 10d (12) transferred to the stack 181 was originally obtained from the stack 12. The reason is that it is desired to deposit in the output stack 181 all of the cards in the stack 12 having information corresponding to the cards in the stack 14 as well as all of the cards from the input stack 14.

The pulse introduced from the comparator 266 to the lead 292 also passes through the "or" network 324 to the left input terminal of the flip-flop 326 to produce a relatively high voltage on the left output terminal of this flip-flop. This voltage is impressed on the "and" network 303 to prepare the "and" network for the passage of a signal. When the sensor arm 103 is actuated by the card 10b (14), the multivibrator 322 causes the "and" network 303 to pass a signal to the flip-flop 334. This causes the vacuum force in the retainer 15a to become interrupted so that the next card in the stack 12 will become transferred to the periphery of the drum 20 from the input stack. This card may be designated as "10e (12)." The card 10e (12) leads the card 10b (14) on the drum 20 by a distance corresponding to the distance between the input stack 12 and the finger 103a of the sensor 103.

The pulse from the "and" network 303 returns the flip-flop 326 to the false state of operation. However, the pulse has no effect on the flip-flop 258 since the flip-flop already has a relatively high voltage on its right output terminal. Moreover, the output pulse from the "and" network 303 has no effect on the flip-flop 335, since the flip-flop because of the relatively high voltage already provided on the left output terminal of the flip-flop.

The card 10e (12) is now read by the heads 122, 124, 126 and 128. Because of the triggering of the flip-flop 217 upon the actuation of the sensor arm 103 by the card 10b (14) and because of the high voltage on the right output terminal of the flip-flop 258, the information on the selected vertical column of the card 10e (12) becomes stored in the flip-flops 260, 262 and 264. This information may have a decimal value of "4," which is greater than the decimal value of "3" previously stored in the flip-flops 284, 286 and 288 by the card 10b (14). Therefore, the comparator 266 produces an output pulse for introduction to the lead 290.

Because of the high voltage on the right output terminal of the flip-flop 258, the pulse on the lead 290 passes through the "and" network 308 and the "or" network 395 to the right input terminal of the flip-flop 318. The pulse triggers the flip-flop 318 to produce a relatively high voltage on the right output terminal of the flip-flop. This assists in conditioning the "and" networks 313 and 315 for the passage of signals. However, only the "and" network 313 is actually conditioned since it receives a relatively high voltage from the left output terminal of the flip-flop 335.

Since the "and" network 313 is conditioned for the passage of a signal, the pulse on the line 290 passes through the "or" network 314, the delay line 316, the "and" network 313, the delay line 317 and the "or" network 325 to the left input terminal of the flip-flop 349. Because of the delays provided by the lines 316 and 317, the lifter 90a associated with the output stack 181 becomes actuated at the proper time for transferring the card 10b (14) to the stack. This is proper because all the cards from the input stack 14 are to be deposited in the output stack 181. The card 10e (12), however, moves past the output stacks 174 and 181 toward the sensor 103.

The pulse on the lead 290 also triggers the flip-flop 328 to the true state of the flip-flop such that a relatively high voltage is impressed on the "and" network 301. Upon the actuation of the sensor arm 103 by the card 10e (12), the "and" network 301 receives a high voltage from the left output terminal of the multivibrator 322 and passes this voltage as a pulse through the "or" network 358 to the left input terminal of the flip-flop 360. This pulse triggers the flip-flop 360 so as to interrupt the vacuum force in the retainer 15 and to obtain a transfer of the next card in the input stack 14 to the drum 20. This card may be designated as 10c (14). The card 10c (14) leads the card 10e (12) on the drum 20 by a distance corresponding to the distance between the input stack 14 and the finger 103a of the sensor 103.

The pulse from the "and" network 301 also passes through the "or" network 397 and the lead 295 to the left input terminal of the flip-flop 258 to trigger the flip-flop for the production of a relatively high voltage on the left output terminal of the flip-flop. The pulse from the "and" network 301 also triggers the flip-flop 335 to the false state of operation, as represented by a relatively high voltage on the right output terminal of the flip-flop.

The information on the card 10c (14) is read by the heads 122, 124, 126 and 128. Because of the triggering of the flip-flop 217 upon the actuation of the sensor arm 103 and because of the relatively high voltage on the left output terminal of the flip-flop 258, the information on the selected vertical column of the card 10c (14) is stored in the flip-flops 284, 286 and 288. This information may represent a decimal value of "3," which is less than the value of "4" stored in the flip-flops 260, 262 and 264 by the card 10e (12). Therefore, the comparator 266 produces an output pulse on the lead 290.

The pulse on the lead 290 passes through the "and" network 302, which has been conditioned by the relatively high voltage on the left output terminal of the flip-flop 258 to pass a signal. The signal from the "and" network 302 then passes through the "or" network 393 to the left input terminal of flip-flop 318. This signal triggers the flip-flop 318 to the true state of operation. In the true state of operation of the flip-flop 318, the "and" network 311 can pass the pulse on the line 290 to the circuit for controlling the transfer of cards to the output stack 181. This causes the card 10c (14) to become deposited in the output stack 181. This is proper since it is desired to deposit in the stack 181 all of the cards originally obtained from the stack 14.

It will be seen from the above discussion that the system operates to produce a separation of the cards in the input stacks 12 and 14 in accordance with the information at a selected vertical column on each card. All of the cards in the input stack 14 pass to the output stack 181. Particular cards in the input stack 12 also pass to the output stack 181. These cards have information at the selected vertical column corresponding to the information at the selected vertical column of the cards in the input stack 14. The remaining cards in the input stack 12 pass to the output stack 174.

In this way, the system performs a collating operation on the cards. In such a collating operation, the cards from one or more input stacks pass to one or more output stacks in accordance with the information on the cards. In the collating apparatus constituting this invention, only one rotatable drum is required. Furthermore, no movable parts are required in direct association with the drum to obtain the withdrawal of cards from the input stacks and the transfer of cards to the output stacks.

It should be appreciated that the collating operation described above is only by way of example and that other types of collating operations may be performed by the apparatus merely by designing the control system so that it will operate in accordance with a desired pattern. For example, the cards transferred from the input stack 12 to the output stack 181 can be separated from the cards originally obtained from the stack 14 by producing certain limited modifications of the apparatus. Various types of sorting or merging operations can also be performed on apparatus similar to that described above such that only one rotatable drum would be required.

It should also be appreciated that collating systems can be provided which require only a single drum such as the drum 20 and which use different numbers of input and output stacks than the embodiment described above and shown in the drawings.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for collating a plurality of information storage cards, means including a single and individual transport member for providing a movement of the cards, first input transfer means responsive to an applied signal for causing a first card to be transferred to said transport member, second input transfer means responsive to an applied signal for causing a card to be transferred to said transport member, means including transducer means responsive to each transported card for reading selected signal indications on each transported card to produce signal information in accordance with such signal indications, control means including means operative after the transfer of the first card to the transport member for impressing a signal on said second input transfer means to cause a second card to be transferred to said transport member for the reading of signal indications on the card, means responsive to the signal indications read on the first and second cards by the transducing means and including comparison means for comparing the signal information from said transducer means for the two transported cards to produce a control signal indicative of such comparison, output means disposed to receive cards from the transport member, and control means for said output means and responsive to such control signal from the comparison means to cause one or the other of the cards on said transporting member to be transferred to said output means.

2. In combination for collating a plurality of information storage cards, means incuding a single and individual rotatable drum for holding cards in fixed position on the drum during the drum rotation, input transfer means responsive to an applied signal for causing cards to be transferred to the periphery of said drum, means including transducer means coupled to the cards transported by the drum for reading signal indications at a particular position on each card transported by said drum to produce signal information in accordance with such signal indications, first control means operative after the transfer of a first card to the drum for impressing a signal on said input transfer means to cause a second card to be transferred to said drum, means coupled to the transducer means for comparing the signal information from said transducer means for the two cards concurrently on said drum to produce a control signal indicative of such comparison, output means disposed in coupled relationship to the drum for receiving cards from the drum and disposed at a position past the transducer means in the direction of rotation of the drum, and control means responsive to such control signal from such comparison means to cause one or the other of the cards on said drum to be selected by said output means in accordance with such comparison.

3. The combination defined in claim 2 in which said first control means includes a sensor mechanism responsive to the card other than the one selectced by said output transfer means to cause a further card to be transferred to said drum.

4. In combination for transferring a plurality of information storage cards from at least one input stack to at least two output stacks, means including a single and individual rotatable drum for transporting the cards from the input to the output stacks and disposed in coupled relationship to the input and output stacks, the output stacks being displaced along the drum in the direction of drum rotation relative to the input stacks, input transfer means responsive to an applied signal for causing cards to be released from the input stack and transferred to the periphery of said drum, means including transducer means for reading signal indications at a particular position on each card transported by said drum to produce signal information in accordance with such signal indications, control means including a sensor mechanism for impressing a signal on said input transfer means in accordance with the response of said sensor to a card on said drum to cause a second card to be transferred to said drum, means coupled to the transducer means for comparing the signal information from said transducer means for the two cards concurrently on said drum to produce a control signal indicative of such comparison, first and second output transfer means respectively associated with the output stacks, for obtaining a transfer of cards from the drum to the output stacks and control means for said first and second output transfer means and responsive to such control signal from said comparing means to cause one or the other of the cards on the drum to be selected by one or the other of the output stacks in accordance with such comparison.

5. The combination defined in claim 4 in which said sensor mechanism is positioned adjacent the periphery of said drum past said first and second output transfer means in the direction of rotation of said drum.

6. In apparatus for transferring a plurality of information storage cards from at least one input stack to at least two output stacks in accordance with information recorded on such cards, means including a single transport member for obtaining a movement of cards from the input to the output stacks, the output stacks and the input stack being disposed in coupled relationship to the transport member and the output stacks being displaced from the input stack in the direction of movement of the cards, input transfer means responsive to an applied signal for causing a card to be released from the input stack and transferred to said transport member, means responsive to the transported cards for reading and storing selected information from each transported card, means coupled to the reading and storing means for comparing the stored information on the transported cards to produce different control signals in accordance with such comparisons, and means responsive to said control signals from the comparison means for obtaining a transfer of the transported cards to different ones of the output stacks in accordance with said control signals.

7. In apparatus for collating a plurality of information storage cards in accordance with information recorded on such cards, at least one input stack, at least two output stacks, means including a single and individual transport member for obtaining a movement of cards from the input to the output stacks, the input and output stacks being disposed in coupled relationship to the transport member and the output stacks being displaced from the input stack along the transport member in the direction of movement of the cards, means responsive to the transported cards for reading selected information from each card, means responsive to the signal information produced by the last mentioned means for providing a comparison of the selected information on successive pairs of transported cards and for producing different control signals in accordance with such comparison, and means responsive to such control signals for obtaining a transfer of one of the transported cards in each successive pair to different ones of said output stacks in accordance with the different control signals.

8. In apparatus for collating a plurality of information storage cards in accordance with information recorded on such cards, means including a single and individual rotatable drum for transporting such information storage cards, at least one input stack disposed contiguous to said drum, at least two output stacks disposed contiguous to said drum and angularly spaced from said input stack and from one another about the periphery of said drum and in the direction of rotation of the drum, said drum transporting cards from said input to said output stacks, means including input transfer means coupled to said input stack for causing a card to be released from the input stack directly onto said rotatable drum, means disposed between the input and output stacks and responsive to the cards transported by the drum for reading and storing selected information from each card transported by said rotatable drum, means coupled to the reading and storage means for comparing the stored information on cards being concurrently transported by the drum to produce different control signals in accordance with such comparisons, and means responsive to said control signals from the comparison means for obtaining a transfer of cards on said drum directly to different ones of said output stacks in accordance with said control signals.

9. In apparatus for transferring a plurality of information storage cards from a least a pair of input stacks to at least a pair of output stacks in accordance with information on such cards, means including a single and individual rotatable drum for transporting cards from the input stacks to the output stacks, input transfer means disposed in coupled relationship to the input stacks for controlling the transfer cards from the input stacks to said drum, means responsive to the cards being transported by the drum for decoding selected information on each such card transferred to said drum and for storing the decoded information, means coupled to the storage means for comparing the decoded information on successive cards being simultaneously transported by the drum and for producing different control signals in accordance with such comparisons, means responsive to the control signals from the comparison means and including output transfer means coupled to the drum and to the output stacks for obtaining a transfer of certain cards on said drum to selected ones of the output stacks, sensing means positioned in contiguous relationship to the drum and operative by cards on said drum other than those transferred to the output stacks, and control means responsive to the operation of the sensing means and to the signals from the comparing means for operating upon the input transfer means to obtain the transfer of cards to said drum from selected ones of the input stacks in accordance with the particular control signal produced by the comparing means.

10. In apparatus for transferring a plurality of information storage cards from at least one input stack to at least two output stacks in accordance with information recorded on such cards, means including a single and individual rotatable drum for transporting cards from the input to the output stacks, input transfer means responsive to an applied signal and coupled to the input stack for causing a card to be released from the input stack and transferred to said rotatable drum, means responsive to cards transported by said drum for reading and storing selected information from a first card transferred to said rotatable drum by said input transfer means, means coupled to said storage means for comparing the stored information from such first card with a selected standard to produce a control signal in accordance with such comparison, and means responsive to such control signal from such comparison means for inhibiting the response of the output stacks to such first card for at least the first time such card is transported by said drum past the output stacks.

11. The apparatus defined in claim 10 which further includes sensor means responsive to the first card on said drum transported past the output stacks to produce a control signal for actuating said input transfer means for a release of the next card in the input stack and for the transfer of this card to the drum.

12. In apparatus for transferring a plurality of information storage cards from at least one input stack to at least two output stacks in accordance with information recorded on such cards, means including a single and individual transport member for obtaining a movement of cards from the input to the output stacks, input transfer means coupled to the transport member and to the input stack for causing a card to be released from the input stack and transferred to said transport member, means disposed in coupled relationship to the transport member for reading and storing selected information from a first card transferred to said transporting member by said input transfer means, means coupled to the storage means for comparing the stored information from such first card with a selected standard to produce a control signal in accordance with such comparison, and means responsive to such control signal from the comparing means for inhibiting the response of the output stacks to such first card for at least the first time the card is transported by the output stacks.

13. In apparatus for transferring a plurality of information storage cards from first and second input stacks to first and second output stacks in accordance with the comparison of selected information recorded on such cards, means including a single and individual rotatable drum for transporting cards from the input stacks to the output stacks, the input stacks and the output stacks being respectively disposed in coupled relationship to the drum at successive positions in the direction of the drum rotation, first and second input transfer units respectively disposed in coupled relationship to the first and second input stacks and each responsive to an applied signal for causing cards to be transferred from its associated input stack to said drum, first and second output transfer units respectively disposed in coupled relationship to the first and second output stacks and the drum and each responsive to an applied signal for selecting cards from said drum to be deposited in its associated output stack, starting means coupled to said first input transfer means for applying a signal to said first input transfer means to cause a first card to be transferred from the first input stack to said drum, means responsive to the cards being transported by said drum for reading selected information from such first card and for comparing the selected information with a selected standard to produce a first control signal, means responsive to the first control signal from the comparing means for inhibiting the response of said output transfer means to the first card when the same is first transported by said drum past said output transfer units, sensor means responsive to the first card on said drum to produce a second control signal, and means responsive to said first and second control signals for supplying a third control signal to said second input transfer unit to cause a card to be transferred from the second input stack to said drum to constitute the second card on said drum.

14. In apparatus for transferring a plurality of information storage cards from first and second input stacks to first and second output stacks in accordance with the comparison of selected information recorded on such cards, means including a single and individual rotatable drum for transporting cards from the input stacks to the output stacks, the input stacks and the output stacks being disposed in coupled relationship to the drum at successive positions along the drum in the direction of drum rotation, said drum normally having two cards thereon of which one only is deposited in one of the output stacks for each complete revolution of the drum, first and second input transfer units respectively coupled to the first and second input stacks and each responsive to an applied signal for causing cards to be transferred from its associated input stack to said drum, first and second output transfer units respectively coupled to the first and second output stacks and the drum and each responsive to an applied signal for selecting cards from the drum and depositing such cards in the associated output stack, means responsive to the cards being transported by the drum for reading selected information from the cards and for comparing the information to produce a first control signal dependent upon such comparison, means including control means for said first and second output transfer units and responsive to the first control signal for impressing a signal on one of the transfer units to cause a selected one of the cards on said drum to be deposited in the output stack in accordance with said first control signal, means including a sensor responsive to the card remaining on said drum for producing a second control signal, and means responsive to said first and second control signals for supplying a signal to a selected one of said input transfer units to cause a card to be transferred to said drum from one of the input stacks in accordance wtih said first control signal.

15. In apparatus for collating a plurality of information storage cards in accordance with information recorded on such cards, means including a single and individual rotatable drum for transporting such information storage cards, first and second input stacks disposed contiguous to said drum at spaced angular positions about the periphery of the drum, first and second output stacks disposed contiguous to said drum at spaced angular positions about the periphery of the drum and displaced angularly from said input stacks in the direction of drum rotation, said rotatable drum transporting cards from the input to the output stacks and normally having two cards thereon of which only one is deposited in an output stack for each complete revolution of the drum, first and second input transfer units respectively coupled to the first and second input stacks and each responsive to an applied signal for causing cards to be transferred from the associated input stack to said drum, first and second output transfer units respectively coupled to the first and second output stacks and to the drum and each responsive to an applied signal for selecting cards from the drum and depositing such cards in the associated output stack, means including a plurality of transducer heads disposed in contiguous relationship to the periphery of said drum between said input and output stacks for reading selected information recorded on the cards transported by said drum, means coupled to the last mentioned means for comparing the information on one of the cards normally transported by said drum with the information on the other card transported by the drum to produce a first control signal dependent upon such comparison, means including a control circuit for said first and second output transfer units and responsive to the first control signal for impressing a signal on a particular one of said transfer units to cause a selected one of the cards on said drum to be deposited in the output stack associated with said transfer unit in accordance with said first control signal, means including a sensor responsive to the card remaining on said drum for producing a second control signal, and means responsive to said first and second control signals for applying a signal to a selected one of said input transfer units to cause a card to be transferred to said drum from the input stack associated with said selected transfer unit in accordance with said first control signal.

16. In combination for use with a plurality of cards each having a plurality of positions for holding signal indications representing information in digital form, a first input stack for holding a plurality of cards, a second input stack for holding a plurality of cards, a first output stack for holding cards transferred to it from the first and second input stacks, a second output stack for holding cards transferred to it from the first and second input stacks, means including a single and individual rotatable drum disposed in coupled relationship to the input and output stacks for receiving cards from the input stacks and for transferring the cards to the output stacks, the output stacks being displaced from the input stacks along the drum in the direction of drum rotation, means responsive to the cards on the drum for selectively reading the signal information at particular positions on the cards transferred to the drum, input transfer means coupled to the input stacks for providing for a transfer of cards from the first and second input stacks to the drum, means coupled to the reading means, means for comparing the signal indications at the selective positions on the pairs of cards concurrently moving with the drum during the successive cycles of drum rotation, control means including means coupled to the comparing means for obtaining a transfer of a particular one of the cards in each pair on the drum to a particular one of the output stacks in accordance with the results obtained by the comparing means, and control means including means coupled to the comparing means and operative upon the input transfer means to obtain a replacement of each card transferred from the drum to the output stack by the next card in a particular one of the input stacks in accordance with the results obtained by the comparing means.

17. In combination for use with a plurality of cards each having a plurality of positions for holding signal indications representing information in digital form, a first input stack for holding a plurality of cards, a second input stack for holding a plurality of cards, a first output stack for holding a plurality of cards transferred to it from the first and second input stacks, a second output stack for holding a plurality of cards transferred to it from the first and second input stacks, means including a single and individual rotatable drum disposed in contiguous relationship to the input and output stacks to receive pairs of cards from the input stacks and to transfer one of the cards in each pair to the output stacks, the output stacks being displaced along the drum from the input stacks in the direction of drum rotation, means including transducing means responsive to the cards being transported by the drum for selectively reading in each cycle of drum rotation signal indications on the cards transferred to the drum, means coupled to the transducing means for comparing the signal indications selectively read on the cards in each cycle of drum rotation to provide signal indications in accordance with such comparison, control means including means coupled to the comparing means for providing for a transfer of a selected one of the cards in each pair to a particular one of the output stacks in accordance with the signal indications produced by the comparing means, and control means including means coupled to the comparing means for providing for a transfer in each cycle of drum rotation of the next card in a particular one of the input stacks to the drum in accordance with the signal indications produced by the comparing means to form a pair with the card remaining on the drum from the previous cycle of drum rotation.

18. In combination for use with a plurality of cards each having a plurality of positions for holding signal indications representing information in digital form, means including a first input stack for holding a plurality of cards and actuatable to provide a transfer of cards from the stack, means including a second input stack for holding a plurality of cards and actuable to provide a transfer of cards from the stack, means including a first output stack for holding a plurality of cards transferred to it from the first and second input stacks and actuatable to receive cards withdrawn from the input stacks, means including a second output stack for holding a plurality of cards transferred to it from the first and second input stack and actuatable to receive cards withdrawn from the input stacks, means including a single and individual rotatable drum associated with the input and output stacks for receiving cards from the input stacks and for moving the cards to the output stacks for transfer to the output stacks, means responsive to the cards moving with the drum past a particular position for reading the signal indications at particular positions on the cards transferred from the input stacks to the drum during each cycle of drum rotation and for storing such signal indications, means coupled to the reading means for comparing the signal indications stored for each pair of cards concurrently moving with the drum and for producing signal indications in accordance with such comparisons, means including delay means and at least one "and" network responsive to the signals from the comparing means and including output transfer means responsive to the signal indications from the delay means for actuating the output transfer means at the time that a particular one of the cards in the pair is moving past a particular output stack in each cycle of drum rotation to obtain a transfer of the particular card to the particular output stack and a movement of the other card in the pair with the drum through another cycle of drum rotation, and means responsive to the signals from the comparing means and operative upon a movement with the drum of the other card in the pair past a particular position and including input transfer means for actuating the input transfer means in accordance with the signals from the comparing means to substitute a new card in each cycle of drum rotation for the card transferred to the output stack in the preceding cycle of drum rotation.

19. In combination for use with a plurality of cards each having a plurality of positions for holding signal indications representing information in digital form, a single and individual rotatable drum, a first input stack for holding a plurality of cards for transfer to the drum, a second input stack for holding a plurality of cards for transfer to the drum, a first output stack, first actuating means associated with the first output stack and operative when energized to obtain a transfer of cards from the drum to the stack, a second output stack, second actuating means associated with the second output stack and operative when energized to obtain a transfer of cards from the drum to the stack, the first and second output stacks being displaced along the drum relative to the input stacks in the direction of rotation of the drum, a plurality of "and" networks, a plurality of delay lines associated with the different "and" networks and particular ones of the first and second actuating means to provide individual delays for the passage of the signals to the actuating means upon the opening of the "and" networks, means coupled to particular ones of the "and" networks for preparing the particular "and" networks for opening in accordance with the transfer of cards to the drum from either the first or second input stacks, means responsive to the cards moving with the drum past a particular position for reading the signal indications at selective positions on the cards transferred to the drum and for storing such signal indications, means responsive to the signal indications from the reading and storing means for comparing the signal indications stored for the cards concurrently moving with the drum and for producing signal indications representing the results of such comparison, means including control means responsive to the signals from the comparing means for opening a particular one of the prepared "and" networks in accordance with the results obtained from the comparing means to obtain a passage of signals to the associated actuating means for a transfer of a particular one of the cards to the output stack opened by that actuating means, and means including control means responsive to the signals from the comparing means for operating upon a particular one of the input stacks in accordance with the signals from the comparing means to obtain a transfer of the next card in the stack to the drum upon a movement of the remaining card on the drum past a particular position in each cycle of drum rotation to provide a replacement of the card previously transferred to the output stack.

20. In combination for collating a plurality of information storage cards, a single and individual transport member for the cards, a pair of input stacks disposed in coupled relationship to the transport member for providing a transfer of cards to the transport member, a pair of output stacks disposed in coupled relationship to the transport member for receiving cards from the transport member and separated from the input stacks in the direction of movement of the cards, means including transducing means disposed in coupled relationship to the transported cards on the single and individual transport member for sensing selected signal information on the cards and for storing such selected information from the cards being transported at any instant, means including comparing means responsive to the signals from the transducing means for comparing the stored information from the cards being transported at that instant to obtain signals in accordance with such comparison, means including electrical circuitry responsive to the signal indications from the comparing means and including output transfer means operative by the signals produced by the electrical circuitry and coupled to the single and individual transport member and to the output stacks for obtaining the transfer of a particular one of the cards being transported at that instant to a particular one of the output stacks in accordance with the comparison of the stored information, and means including electrical circuitry responsive to the signal indications from the comparing means and including control means operative by the signals produced by the electrical circuity and coupled to the input stacks for obtaining the transfer of a next card to the transport means from a particular one of the input stacks in accordance with the stored information.

21. Apparatus as set forth in claim 20 in which the single and individual transport member is movable and is constructed to provide a movement of the cards with the transport member.

22. In combination for collating a plurality of information storage cards, a single and individual transport member for the cards, means including a pair of input stacks and including a pair of input transfer means disposed relative to the single and individual transport member and the input stacks to provide for a transfer of cards to the transport member, means including a pair of output stacks and including a pair of output transfer means disposed relative to the transport member and the output stacks to provide for a transfer of cards from the transport member to the output stacks, means including transducing means responsive to the transported cards for reading selected information on the cards and for storing the information during the transport of the cards, means including electrical circuitry responsive to the stored information for comparing the stored information on the cards being transported to produce signals in accordance with such comparison, means including electrical circuitry responsive to the signals from the comparing means and including the output transfer means coupled to the electrical circuitry for providing for a transfer of a particular one of the cards to a particular one of the output stacks in accordance with the results of the comparison and including delay lines in the electrical circuitry for obtaining an operation of the output transfer means upon the movement of the cards at the position of transfer to the particular output stack and in accordance with the distance between the input stack supplying the particular card to the transport means and the output stack, and means including electrical circuitry responsive to the signals from the comparing means and including the input transfer means responsive to the electrical circuitry for replacing each card transferred to the output stack with the next card in a particular one of the input stacks and for providing for a transfer of this card to the transport means.

23. In combination for collating a plurality of information storage cards, a single and individual transport member for the cards, means including a pair of input stacks and including a pair of input transfer means disposed relative to the transport member and the input stacks to provide for a transfer of cards to the transport member, means including a pair of output stacks and including a pair of output transfer means disposed relative to the transport member and the output stacks to provide for a transfer of cards from the transport member to the output stacks, means including transducing means responsive to the transported cards for reading selected information on the cards and for storing the information during the transport of the cards, means including the input transfer means for obtaining a transfer of cards from a first one of the input stacks to the transport means and for retaining the first card on the transport means until the transfer of a second card to the transport means, means including electrical circuitry coupled to the transducing means and the input transfer means for obtaining a transfer of a second card from the second one of the input stacks after the transfer of the first cards from the first input stack, means including electrical circuitry coupled to the transducing and storing means for comparing the stored information on the transported cards to provide signals representing the results of such comparison, and means including electrical circuitry coupled to the comparing means for obtaining a transfer of a particular one of the transported cards to a particular one of the output stacks in accordance with the signals representing the results of the comparison.

24. The combination as set forth in claim 23 in which the single and individual transport member is movable and is constructed to provide a movement of the cards with the transport means and in which means are included to obtain a movement of the transport means.

25. In combination for transferring a plurality of information storage cards from a pair of input stacks to at least a pair of output stacks, a single and individual transport member for the cards and disposed relative to the input stacks and the output stacks to receive cards from the input stacks for movement to the output stacks, means including electrical circuitry responsive to the transported cards for sensing and storing selected information on successive pairs of cards being transported at any instant, means including electrical circuitry responsive to the stored information for comparing the stored information for the successive pairs of cards being transported at any instant to produce signals representing the results of such comparison, means including electrical circuitry for indicating the particular stack from which each transported card is obtained, means including electrical circuitry responsive to the signals from the comparing means and from the last mentioned means for providing for a transfer of a particular one of the transported cards in each successive pair to a particular one of the output stacks in accordance with the results of the comparison and in accordance with the particular input stack from which the particular card was obtained, and means including electrical circuitry responsive to the signals from the comparing means for providing for a transfer of a next card in a particular one of the input stacks to the transport means in accordance with the results of the comparison and to replace the card transferred to the output stacks.

26. The combination as set forth in claim 25 in which output transfer means are coupled to the single and individual transport member and the output stations to provide for a transfer of cards from the transport member to the output stations and in which the electrical circuitry operative to obtain the transfer of cards to particular output stations is coupled to the output transfer means to obtain an operation of the output transfer means and includes delay circuitry for delaying the operation of the output transfer means in accordance with the distance between the input stations supplying the cards and the output stations receiving the cards.

27. The combination as set forth in claim 26 in which means are included to sense the movement at a particular position on the transport member of the card being retained on the transport member in each pair and in which the means for obtaining the transfer of a next card from the input stations are coupled to the sensing means to provide for such a transfer upon the sensing of the card still remaining on the transport member and in which the delay circuitry is operative to delay the operation of the output transfer means in accordance with the distance between the card remaining on the transport member and the next card transferred to the transport member.

28. In combination for collating a plurality of information storage cards, transport means constructed to obtain a movement of the cards in the plurality and to obtain a repetitive movement of the cards through successive cycles, a pair of input stacks disposed in coupled relationship to the transport means for providing a transfer of cards to the transport means, a pair of output stacks disposed in coupled relationship to the transport means for receiving cards from the transport means and separated from the input stacks in the direction of movement of the cards, means including transducing means disposed in coupled relationship to the cards on the transport means for sensing selected signal information on such cards, means including comparing means responsive to the signals from the transducing means for comparing the information sensed from the cards on the transport means to produce signals in accordance with such comparison, means including electrical circuitry responsive to the signal indications from the comparing means and including output transfer means operative by the signals produced by the electrical circuitry and coupled to the cards on the transport means for obtaining the transfer of a particular one of the cards being transported at that instant to a particular one of the output stacks in accordance with the comparison of the information from the cards on the transport means and for obtaining the transport of the other cards on the transport means through another repetitive cycle, and means including electrical circuitry responsive to the signal indications from the comparing means and including control means operative by the signals produced by the electrical circuitry and coupled to the input stacks for obtaining the transfer of a next card in a particular one of the input stacks to the transport means from that stack in accordance with the stored information.

29. In combination for collating a plurality of information storage cards, transport means constructed to obtain a movement of the cards and to obtain a movement of the cards through successive repetitive cycles in which each card is transported along the same path regardless of the number of repetitive cycles of movement, means including a pair of input stacks and including a pair of input transfer means disposed relative to the transport means and relative to the input stacks to provide for a transfer of cards to the transport means from the input stacks, means including a pair of output stacks and including a pair of output transfer means disposed relative to the transport member and the output stacks to provide for a transfer of cards from the transport means to the output stacks, means including transducing means responsive to the transported cards for reading selected information on the cards, means including electrical circuitry responsive to the signals from the transducing means for comparing such signals to produce signals in accordance with such comparison, means including electrical circuitry responsive to the signals from the comparing means and coupled to the output transfer means for providing for a transfer of a particular one of the cards on the transport means to a particular one of the output stacks in accordance with the results of the comparison and for providing for the movement of the other cards on the transport means through at least one additional repetitive cycle, and means including electrical circuitry responsive to the signals from the comparing means and coupled to the input transfer means for replacing each card transferred to the output stack with the next card in a particular one of the input stacks and for providing a transfer of this card to the transport means.

30. In combination for collating a plurality of information storage cards, transport means constructed to obtain a movement of the cards through successive repetitive cycles wherein each card is moved along the same path as the other cards in the plurality, means including a pair of input stacks and including a pair of input transfer means disposed relative to the transport means and to the input stacks to provide for a transfer of cards from the input stacks to the transport means, means including a pair of output stacks and including a pair of output transfer means disposed relative to the transport member and the output stacks to provide for a transfer of cards from the transport member to the output stacks, means including transducing means responsive to the transported cards for reading selected information on such cards, means including electrical circuitry coupled to the input transfer means and to the transducing means for obtaining a transfer of a card from a first one of the input stacks to the transport means and for retaining the first card on the transport means until the transfer of a second card to the transport means, means including electrical circuitry coupled to the transducing means and the input transfer means for obtaining a transfer of a second card to the transport means from the second one of the input stacks after the transfer of the first card from the first input stack to the transport means, means including electrical circuitry responsive to the signals from the transducing means for comparing the information read by the transducing means to provide signals representing the results of such comparison, and means including electrical circuitry coupled to the comparing means for obtaining a transfer of a particular one of the transported cards in the pair to a particular one of the output stacks in accordance with the signal representing the results of the comparison and for obtaining a movement of the other card in the pair by the transport means through an additional repetitive cycle.

31. In combination for transferring a plurality of information storage cards from a pair of input stacks to at least a pair of output stacks, transport means constructed to obtain a movement of the cards in the plurality and to obtain a movement of each card in the plurality along the same path as the other cards in the plurality and disposed relative to the input stacks in the pair and the output stacks in the pair to receive cards from the input stacks for movement to the output stacks, means including electrical circuitry responsive to the transported cards for sensing particular information on successive pairs of cards being transported at any instant, means including electrical circuitry responsive to the information sensed by the transducing means for comparing such information for the successive pairs of cards being transported at any instant to produce signals representing the results of such comparison, means including electrical circuitry for indicating the particular stack from which each transported card is obtained, means including electrical circuitry responsive to the signals from the comparing means and from the last mentioned means for providing for a transfer of a particular one of the transported cards in each successive pair to a particular one of the output stacks in accordance with the results of the comparison and in accordance with the particular input stack originally holding the particular card in the pair and for obtaining a transport of the other card in the pair through at least an additional cycle of repetitive movement, and means including electrical circuitry responsive to the signals from the comparing means for providing for a transfer of a next card in a particular one of the input stacks to the transport means in accordance with the results of the comparison to form a new pair with the card being transported through the additional cycle of repetitive movement.

32. The combination set forth in claim 30 in which means including electrical circuitry are responsive to the signals from the comparing means and are coupled to the input transfer means to obtain a transfer of a card in one of the input stacks to the transport means in accordance with the results of the comparison and to provide a comparison with the card moving through the additional repetitive cycle.

References Cited in the file of this patent

UNITED STATES PATENTS

| | | |
|---|---|---|
| 1,669,238 | Goss | May 8, 1928 |
| 1,710,691 | Carroll | Apr. 10, 1929 |
| 2,359,670 | Page | Oct. 3, 1944 |
| 2,539,998 | Holland-Martin et al. | Jan. 30, 1951 |
| 2,620,924 | Kuesters | Dec. 9, 1952 |
| 2,686,052 | Winkler | Aug. 10, 1954 |
| 2,712,898 | Knutsen | July 12, 1955 |
| 2,752,154 | Nelson | June 26, 1956 |
| 2,764,408 | Weiler | Sept. 25, 1956 |
| 2,795,328 | Tyler et al. | June 11, 1957 |